(12) United States Patent
Yamamoto et al.

(10) Patent No.: US 7,877,361 B2
(45) Date of Patent: Jan. 25, 2011

(54) MANAGEMENT DEVICE AND METHOD FOR STORAGE DEVICE EXECUTING CDP-BASED RECOVERY

(75) Inventors: Masayuki Yamamoto, Sagamihara (JP); Wataru Okada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 428 days.

(21) Appl. No.: 12/019,829

(22) Filed: Jan. 25, 2008

(65) Prior Publication Data

US 2008/0243956 A1  Oct. 2, 2008

(30) Foreign Application Priority Data

Mar. 27, 2007  (JP) ............... 2007-081659

(51) Int. Cl.
G06F 7/00 (2006.01)
(52) U.S. Cl. ...................... 707/648; 711/162
(58) Field of Classification Search ............... 707/640, 707/648; 711/162
See application file for complete search history.

(56) References Cited

U.S. PATENT DOCUMENTS

| | | | | |
|---|---|---|---|---|
| 7,111,136 | B2* | 9/2006 | Yamagami | 711/162 |
| 7,350,043 | B2* | 3/2008 | Andre et al. | 711/162 |
| 7,418,546 | B2* | 8/2008 | Taguchi et al. | 711/112 |
| 7,594,085 | B1* | 9/2009 | Rao | 711/159 |
| 2004/0193945 | A1* | 9/2004 | Eguchi et al. | 714/6 |
| 2004/0268067 | A1* | 12/2004 | Yamagami | 711/159 |
| 2005/0028022 | A1* | 2/2005 | Amano | 714/2 |
| 2005/0055518 | A1* | 3/2005 | Hochberg et al. | 711/159 |
| 2005/0193244 | A1* | 9/2005 | Stager et al. | 714/12 |
| 2005/0262377 | A1* | 11/2005 | Sim-Tang | 714/1 |
| 2006/0288183 | A1* | 12/2006 | Boaz et al. | 711/164 |
| 2007/0033368 | A1* | 2/2007 | Taguchi et al. | 711/170 |
| 2007/0033370 | A1* | 2/2007 | Zohar et al. | 711/173 |
| 2007/0094316 | A1* | 4/2007 | Rodriguez et al. | 707/205 |
| 2007/0112893 | A1* | 5/2007 | Okada et al. | 707/204 |
| 2007/0112894 | A1* | 5/2007 | Okada et al. | 707/204 |
| 2007/0220326 | A1* | 9/2007 | Ninose et al. | 714/17 |
| 2008/0071841 | A1* | 3/2008 | Okada et al. | 707/202 |

FOREIGN PATENT DOCUMENTS

JP  2005-18738 A  1/2005

OTHER PUBLICATIONS

Jun et al. Proceedings of International Workshop on Storage Network Architecture and Parallel I/Os, in corporation with the 14th International Conference on Parallel Architectures and Compilation Techniques (PACT05), Sep. 18, 2005, Saint Louis, U.S.A., pp. 33-40.*

* cited by examiner

*Primary Examiner*—Cheyne D Ly
(74) *Attorney, Agent, or Firm*—Sughrue Mion, PLLC

(57) ABSTRACT

A management device of a storage device that executes CDP-based recovery comprises: a data protection term acquisition section that acquires a data protection term which is a term in which recovery of a data volume is ensured from a predetermined duration for which a predetermined time is a reference point; and a control section that executes control using the data protection term.

8 Claims, 29 Drawing Sheets

FIG. 6

| 12505 | 12510 | 12515 | 12500 |
|---|---|---|---|
| LU ID | CAPACITY | VOL INFORMATION | |
| LU1 | 100GB | STORAGE ST1, st1v01 | |

FIG. 7A

| VOL ID | USED | CAPACITY |
|---|---|---|
| st1v01 | USED | 100GB |
| st1v02 | USED | 100GB |
| st1v03 | NOT USED | 100GB |
| st1v04 | NOT USED | 100GB |
| st1v11 | USED | 100GB |
| st1v12 | USED | 100GB |
| st1v13 | USED | 100GB |
| st1v21 | USED | 100GB |
| st1v22 | USED | 100GB |
| st1v23 | USED | 100GB |
| st1v24 | USED | 100GB |

| CDPG ID | DATA VOL | BASE VOL | JNL VOL |
|---|---|---|---|
| g01 | st1v01 | st1v21<br>st1v22<br>st1v23<br>st1v24 | st1v11<br>st1v12<br>st1v13 |

22310 22320 22330 22340 22300

| SEQUENCE NUMBER | CREATION TIME | DATA VOL ADDRESS | DATA LENGTH | JNL VOL DATA REGION ADDRESS |
|---|---|---|---|---|
| 000 | 2007/01/01 08:00 | 【20GB】 | 1MB | 【0GB】 |
| ... | ... | ... | ... | ... |
| 100 | 2007/01/01 08:10 | 【50GB】 | 2MB | 【20GB】 |
| ... | ... | ... | ... | ... |
| 200 | 2007/01/01 08:40 | 【70GB】 | 1MB | 【50GB】 |
| ... | ... | ... | ... | ... |
| 300 | 2007/01/01 09:10 | 【30GB】 | 3MB | 【100GB】 |
| ... | ... | ... | ... | ... |
| 400 | 2007/01/01 09:40 | 【80GB】 | 2MB | 【140GB】 |
| ... | ... | ... | ... | ... |
| 700 | 2007/01/01 11:10 | 【50GB】 | 1MB | 【290GB】 |

FIG. 9A

| DEVICE ID | DEVICE TYPE | DEVICE INFORMATION | IP ADDRESS |
|---|---|---|---|
| ST1 | STORAGE | VENDOR A, MODEL A1, SERIAL NUMBER 10 | 10.10.10.10 |
| H1 | HOST COMPUTER | VENDOR B, MODEL B1, SERIAL NUMBER 11 | 10.10.10.11 |

| STORAGE DEVICE | CDPG ID | CDPG NICKNAME | DATA VOL | JNL VOL CAPACITY | DATA PROTECTION TERM | CHECKPOINT INSTRUCTION INTERVAL |
|---|---|---|---|---|---|---|
| ST1 | g01 | H1 RECOVERY | st1v01 | 300GB | 200GB | THIRTY MINUTES |

| CDP GROUP SETTING SCREEN | |
|---|---|
| STORAGE DEVICE: | ST1  ~90010 |
| CDPG NICKNAME: | H1 RECOVERY  ~90015 |
| DATA VOL: | st1v01  ~90020 |
| JNL CAPACITY: | 300GB  ~90030 |
| DATA PROTECTION TERM: | 200GB  ~90040 |
| CHECKPOINT INSTRUCTION INTERVAL: | EVERY 30 MINUTES  ~90050 |

90060 ~ CDP GROUP SETTING

FIG. 14

CDPG OPERATION STATE DISPLAY SCREEN — 92000

STORAGE DEVICE: ST1 — 92010

CDPG NICKNAME: H1 RECOVERY — 92015

DATA VOL: st1v01 — 92020

HOST NAME: H1 — 92021

LU ID: LU01 — 92022

JNL CAPACITY: 300GB — 92030

DATA PROTECTION TERM: 200GB — 92040

CDPG OPERATION STATE: — 92050

| SELECT | CP ID | TIME | DATA PROTECTION TERM | COPY STATE |
|---|---|---|---|---|
|  | g01_cp01 | 2007/01/01 08:10 | OUTSIDE TERM | COPIED |
| X | g01_cp02 | 2007/01/01 08:40 | OUTSIDE TERM | NOT YET COPIED |
|  | g01_cp03 | 2007/01/01 09:10 | OUTSIDE TERM | NOT YET COPIED |
|  | g01_cp04 | 2007/01/01 09:40 | WITHIN TERM | NOT YET COPIED |
|  | g01_cp05 | 2007/01/01 10:10 | WITHIN TERM | NOT YET COPIED |
|  | g01_cp06 | 2007/01/01 10:40 | WITHIN TERM | NOT YET COPIED |
|  | g01_cp07 | 2007/01/01 11:10 | WITHIN TERM | NOT YET COPIED |

92051, 92052, 92053, 92054, 92055

COPY DESTINATION VOL: st1v04 — 92060

92070 — [ COPY GENERATION ]

FIG. 15A

| VOL ID | USED | CAPACITY |
|---|---|---|
| st1v01 | USED | 100GB |
| st1v02 | USED | 100GB |
| st1v03 | USED | 100GB |
| st1v04 | NOT YET USED | 100GB |
| st1v11 | USED | 100GB |
| st1v12 | USED | 100GB |
| st1v13 | USED | 100GB |
| st1v21 | USED | 100GB |
| st1v22 | USED | 100GB |
| st1v23 | USED | 100GB |
| st1v24 | USED | 100GB |

| CDPG ID | DATA VOL | JNL VOL | BASE VOL |
|---|---|---|---|
| g01 | st1v01 | st1v11<br>st1v12<br>st1v13 | st1v21<br>st1v22<br>st1v23<br>st1v24 |

CDPG OPERATION STATE DISPLAY SCREEN — 92000

| | |
|---|---|
| STORAGE DEVICE: | ST1 — 92010 |
| CDPG NICKNAME: | H1 RECOVERY — 92015 |
| DATA VOL: | st1v01 — 92020 |
|    HOST NAME: | H1 — 92021 |
|    LU ID: | LU01 — 92022 |
| JNL CAPACITY: | 300GB — 92030 |
| DATA PROTECTION TERM: | 200GB — 92040 |

CDPG OPERATION STATE: — 92050

| SELECT | CP ID | TIME | DATA PROTECTION TERM | COPY STATE |
|---|---|---|---|---|
| | g01_cp01 | 2007/01/01 08:10 | OUTSIDE TERM | COPIED |
| | g01_cp02 | 2007/01/01 08:40 | OUTSIDE TERM | COPIED |
| | g01_cp03 | 2007/01/01 09:10 | OUTSIDE TERM | NOT YET COPIED |
| | g01_cp04 | 2007/01/01 09:40 | WITHIN TERM | NOT YET COPIED |
| | g01_cp05 | 2007/01/01 10:10 | WITHIN TERM | NOT YET COPIED |
| | g01_cp06 | 2007/01/01 10:40 | WITHIN TERM | NOT YET COPIED |
| | g01_cp07 | 2007/01/01 11:10 | WITHIN TERM | NOT YET COPIED |

(columns: 92051, 92052, 92053, 92054, 92055)

COPY DESTINATION VOL: [ ] — 92060

92070 — [ COPY GENERATION ]

FIG. 17A

| VOL ID | USED | CAPACITY |
|---|---|---|
| st1v01 | USED | 100GB |
| st1v02 | USED | 100GB |
| st1v03 | USED | 100GB |
| st1v04 | NOT YET USED | 100GB |
| st1v11 | USED | 100GB |
| st1v12 | USED | 100GB |
| st1v13 | USED | 100GB |
| st1v21 | USED | 100GB |
| st1v22 | USED | 100GB |
| st1v23 | USED | 100GB |
| st1v24 | USED | 100GB |

| CDPG ID | DATA VOL | JNL VOL | BASE VOL |
|---|---|---|---|
| g01 | st1v01 | st1v11<br>st1v12<br>st1v13 | st1v21<br>st1v22<br>st1v23<br>st1v24 |

CDPG RECOVERY SCREEN — 93000

| | | |
|---|---|---|
| STORAGE DEVICE: | ST1 | ~93010 |
| CDPG NICKNAME: | H1 RECOVERY | ~93015 |
| DATA VOL: | st1v01 | ~93020 |
|   HOST NAME: | H1 | ~93021 |
|   LU ID: | LU01 | ~93022 |

CDPG RECOVERY SELECTION: ~93033    93030

TIME ELAPSED STATE DISPLAY    DATA PROTECTION TERM

2007/01/01 08:00    2007/01/01 10:50    93031    2007/01/01 12:50

93032

TIME DESIGNATION:    2007/01/01 11:15    ~93040

CDPG OPERATION STATE:    93050

| SELECT | CP ID | TIME | DATA PROTECTION TERM | COPY STATE |
|---|---|---|---|---|
| | g01_cp01 | 2007/01/01 08:10 | OUTSIDE TERM | USED |
| | g01_cp02 | 2007/01/01 08:40 | OUTSIDE TERM | USED |
| | g01_cp07 | 2007/01/01 11:10 | WITHIN TERM | UNUSED |
| | g01_cp08 | 2007/01/01 11:40 | WITHIN TERM | UNUSED |
| | g01_cp09 | 2007/01/01 12:10 | WITHIN TERM | UNUSED |
| | g01_cp10 | 2007/01/01 12:40 | WITHIN TERM | UNUSED |

93051   93052   93053   93054   93055

RECOVERY DESTINATION VOL:    st1v04    ~93060

93070 ~ RECOVERY EXECUTION

FIG. 19A

| CDPG ID (22510) | DATA VOL (22520) | CP ID (22530) | SEQUENCE NUMBER (22540) | BASE VOL (22550) | TIME (22560) | COPY STATE (22570) | COPY EXECUTION (22580) |
|---|---|---|---|---|---|---|---|
| g01 | st1v01 | g01_cp01 | 100 | st1v30 | 2007/01/01 08:10 | COPIED | REQUIRED |
| | | g01_cp02 | 200 | st1v30 | 2007/01/01 08:40 | NOT YET COPIED | NOT REQUIRED |
| | | g01_cp03 | 300 | st1v31 | 2007/01/01 09:10 | NOT YET COPIED | REQUIRED |
| | | g01_cp04 | 400 | st1v31 | 2007/01/01 09:40 | NOT YET COPIED | NOT REQUIRED |
| | | g01_cp05 | 500 | st1v32 | 2007/01/01 10:10 | NOT YET COPIED | REQUIRED |
| | | g01_cp06 | 600 | st1v32 | 2007/01/01 10:40 | NOT YET COPIED | NOT REQUIRED |
| | | g01_cp07 | 700 | st1v33 | 2007/01/01 11:10 | NOT YET COPIED | REQUIRED |

| STORAGE DEVICE (43210) | CDPG ID (43220) | DATA VOL (43230) | JNL CAPACITY (43240) | PROTECTION TERM (43250) | CHECKPOINT INSTRUCTION INTERVAL (43260) |
|---|---|---|---|---|---|
| ST1 | g01 | st1v01 | 300GB | 200GB | THIRTY MINUTES |

FIG. 20

CDP GROUP SETTING SCREEN — 90000'

- STORAGE DEVICE: ST1 — 90010
- CDP GROUP NAME: H1 RECOVERY — 90015
- DATA VOL: st1v01 — 90020
- JNL CAPACITY: 300GB — 90030
- DATA PROTECTION TERM: 200GB — 90040
- CHECKPOINT INSTRUCTION INTERVAL: EVERY 30 MINUTES — 90050
- COPY GENERATION CHECKPOINT INSTRUCTION INTERVAL: EVERY 60 MINUTES — 90060

90060 — [CDP GROUP SETTING]

FIG. 22

CDPG OPERATION STATE DISPLAY SCREEN — 92000'

STORAGE DEVICE: ST1 — 92010

CDP GROUP NAME: H1 RECOVERY — 92015

DATA VOL: st1v01 — 92020

HOST NAME: H1 — 92021

LU ID: LU01 — 92022

JNL CONTENT: 300GB — 92030

DATA PROTECTION TERM: 200GB — 92040

CDPG OPERATION STATE: 92050

| SELECT | CDPG ID | TIME | DATA PROTECTION TERM | COPY STATE | COPY EXECUTION |
|--------|---------|------|----------------------|------------|----------------|
|        | g01_cp01 | 2007/01/01 08:10 | OUTSIDE TERM | COPIED | REQUIRED |
|        | g01_cp02 | 2007/01/01 08:40 | OUTSIDE TERM | NOT YET COPIED | NOT REQUIRED |
|        | g01_cp03 | 2007/01/01 09:10 | OUTSIDE TERM | NOT YET COPIED | REQUIRED |
|        | g01_cp04 | 2007/01/01 09:40 | WITHIN TERM | NOT YET COPIED | NOT REQUIRED |
|        | g01_cp05 | 2007/01/01 10:10 | WITHIN TERM | NOT YET COPIED | REQUIRED |
|        | g01_cp06 | 2007/01/01 10:40 | WITHIN TERM | NOT YET COPIED | NOT REQUIRED |
|        | g01_cp07 | 2007/01/01 11:10 | WITHIN TERM | NOT YET COPIED | REQUIRED |

92051 92052 92053 92054 92055 92056

COPY DESTINATION VOL: [ ] — 92060

92070 — [ COPY GENERATION ]

FIG. 24A

AN EXAMPLE OF RELATIONSHIP BETWEEN BASE VOL CREATION TIME AND APPLICATION JNL AMOUNT PRIOR TO EXECUTION OF STEP S1220

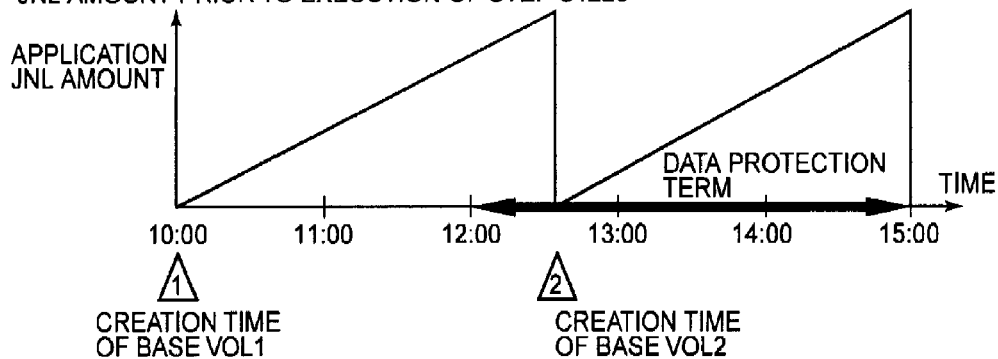

FIG. 24B

AN EXAMPLE OF RELATIONSHIP BETWEEN BASE VOL CREATION TIME AND APPLICATION JNL AMOUNT FOLLOWING EXECUTION OF STEP S1220 (RE-ARRANGEMENT OF BASE VOL CREATION TIMES TO DIVIDE UP DATA PROTECTION TERM INTO EQUAL INTERVALS)

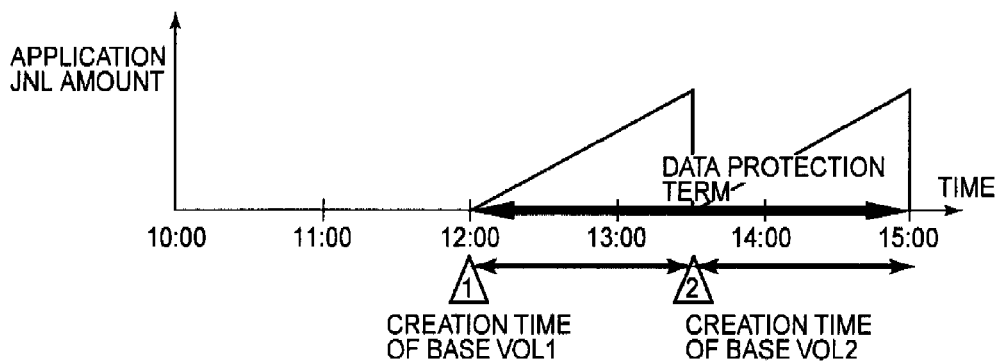

FIG. 24C

AN EXAMPLE OF RELATIONSHIP BETWEEN BASE VOL CREATION TIME AND APPLICATION JNL AMOUNT FOLLOWING EXECUTION OF STEP S1220 (RE-ARRANGEMENT OF BASE VOL CREATION TIMES TO DIVIDE UP APPLICATION JNL AMOUNT INTO EQUAL AMOUNTS)

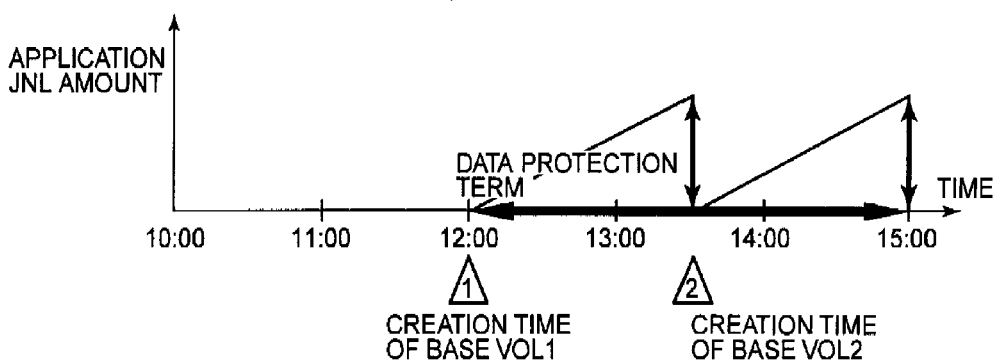

FIG. 26A

| CDPG ID (22510) | DATA VOL (22520) | CP ID (22530) | SEQUENCE NUMBER (22540) | BASE VOL (22550) | TIME (22560) | COPY STATE (22570) |
|---|---|---|---|---|---|---|
| g01 | st1v01 | g01_cp01 | 100 | st1v30 | 2007/01/01 08:10 | COPIED |
| | | g01_cp02 | 200 | st1v30 | 2007/01/01 08:40 | NOT YET COPIED |
| | | g01_cp03 | 300 | st1v31 | 2007/01/01 09:10 | NOT YET COPIED |
| | | g01_cp04 | 400 | st1v31 | 2007/01/01 09:40 | NOT YET COPIED |
| | | g01_cp05 | 500 | st1v32 | 2007/01/01 10:10 | NOT YET COPIED |
| | | g01_cp06 | 600 | st1v32 | 2007/01/01 10:40 | NOT YET COPIED |
| | | g01_cp07 | 700 | st1v33 | 2007/01/01 11:10 | NOT YET COPIED |

| COPY SOURCE VOL (22610) | COPY DESTINATION VOL (22620) | TIME (22630) |
|---|---|---|
| st1v01 | st1v02 | 2007/01/01 08:10 |

CDP GROUP SETTING SCREEN — 90000

- STORAGE DEVICE: ST1 — 90010
- CDPG NICKNAME: H1 RECOVERY — 90015
- HOST NAME: H1 — 90021
- LU ID: LU01 — 90022
- JNL CAPACITY: LAST THREE HOURS — 90031
- DATA PROTECTION TERM: LAST TWO HOURS — 90041
- CHECKPOINT INSTRUCTION INTERVAL: EVERY 30 MINUTES — 90050

90060 — [CDP GROUP SETTING]

FIG. 28A

| CDPG ID | DATA VOL | CP ID | SEQUENCE NUMBER | BASE VOL | TIME | COPY STATE |
|---|---|---|---|---|---|---|
| g01 | st1v01 | g01_cp01 | 100 | st1v30 | 2007/01/01 08:10 | COPIED |
| | | g01_cp02 | 200 | st1v30 | 2007/01/01 08:40 | COPIED |
| | | g01_cp03 | 300 | st1v31 | 2007/01/01 09:10 | NOT YET COPIED |
| | | g01_cp04 | 400 | st1v31 | 2007/01/01 09:40 | NOT YET COPIED |
| | | g01_cp05 | 500 | st1v32 | 2007/01/01 10:10 | NOT YET COPIED |
| | | g01_cp06 | 600 | st1v32 | 2007/01/01 10:40 | NOT YET COPIED |
| | | g01_cp07 | 700 | st1v33 | 2007/01/01 11:10 | NOT YET COPIED |

| COPY SOURCE VOL | COPY DESTINATION VOL | TIME |
|---|---|---|
| st1v01 | st1v02 | 2007/01/01 08:10 |
| st1v01 | st1v03 | 2007/01/01 08:40 |

| CDPG ID | DATA VOL | CP ID | SEQUENCE NUMBER | BASE VOL | TIME | COPY STATE |
|---|---|---|---|---|---|---|
| g01 | st1v01 | g01_cp04 | 400 | st1v31 | 2007/01/01 09:40 | NOT YET COPIED |
| | | g01_cp05 | 500 | st1v32 | 2007/01/01 10:10 | NOT YET COPIED |
| | | g01_cp06 | 600 | st1v32 | 2007/01/01 10:40 | NOT YET COPIED |
| | | g01_cp07 | 700 | st1v33 | 2007/01/01 11:10 | NOT YET COPIED |
| | | g01_cp08 | 800 | st1v33 | 2007/01/01 11:10 | NOT YET COPIED |
| | | g01_cp09 | 900 | st1v33 | 2007/01/01 11:10 | NOT YET COPIED |
| | | g01_cp10 | 1000 | st1v33 | 2007/01/01 11:10 | NOT YET COPIED |

| COPY SOURCE VOL | COPY DESTINATION VOL | TIME |
|---|---|---|
| st1v01 | st1v02 | 2007/01/01 08:10 |
| st1v01 | st1v03 | 2007/01/01 08:40 |

22610 22620 22630 22600

MANAGEMENT DEVICE AND METHOD FOR STORAGE DEVICE EXECUTING CDP-BASED RECOVERY

CROSS-REFERENCE TO PRIOR APPLICATION

This application relates to and claims the benefit of priority from Japanese Patent Application number 2007-81659, filed on Mar. 27, 2007, the entire disclosure of which is incorporated herein by reference.

BACKGROUND

The present invention generally relates to the recovery of data.

Data that has been conventionally saved as non-electronic data by using paper or film or the like is saved as electronic data and adopted in business as a result of the rapid development of an Internet society. In the computer system that saves and uses such data, the loss of data as a result of an unexpected accident or disaster or the like not only brings about stoppage of the computer system but also hinders the continuity of the business, which is a major problem.

In case of such a situation, the data of the storage system used in the computer system are saved to a tape or separate disk or the like at regular intervals. This processing is known as a 'backup'. Further, the process whereby data of the storage system are restored using backup date saved by means of a backup to restore the computer system is called 'recovery'.

Indicators that are used when running such a backup and recovery include a Recovery Time Objective (abbreviated to 'RTO' hereinbelow), a Recovery Point Objective (abbreviated to 'RPO' hereinbelow). An RTO is a target value for the time taken for recovery, that is, a target value for the time taken to restore the computer system by restoring data after the computer system has stopped. An RPO is an indicator that indicates how much data of the storage system can be restored to the data of the most recent time in cases where the computer system has stopped. The shortening of both the RPO and RTO are essential in the backup and recovery operation.

As a technology that is related to the backup and recovery of a storage system, Japanese Application Laid Open No. 2005-18738 is known. Japanese Application Laid Open No. 2005-18738 discloses a CDP (Continuous Data Protection) technology according to which the storage system accumulates journal data (also referred to as 'JNL' hereinbelow) each time the host computer writes data to a data volume of the storage system and shortens the RPO and RTO by using a JNL to restore the data of the data volume. As a result of this technology, even when an application that is running on the host computer is not equipped with a function for accumulating JNL, data are restored by means of JNL that the storage system has accumulated.

According to Japanese Application Laid Open No. 2005-18738, when a JNL volume in which JNL have accumulated is full, an old JNL (normally the JNL that was written at the oldest time) is overwritten with the JNL that is newly written. That is, the oldest restorable time is made current as the JNL volume is updated. Therefore, even when there is a desire to recover data at a time desired by the administrator, these data can sometimes not be recovered.

Furthermore, if the amounts of data written by applications to a data volume and the frequencies with which these data are written are different, because the JNL amounts accumulated per unit time vary, the speed of progress of the oldest restorable time is not limited to a fixed speed. Hence, it is difficult to manage to what extent data of a previous time can be restored.

SUMMARY

Therefore, an object of the present invention is to be able to recover data as far as possible at a time desired by the administrator.

The storage device comprises a data volume which is a logical volume to which data of a write target transmitted from a higher level device are written, a base volume which is a data image of a data volume, a journal storage region that accumulates data written to the data volume as a journal, and a storage control section that recovers a data volume by adopting a journal as a base volume. The management device of the storage device acquires a data protection term which is a term during which the recovery of a data volume is ensured from a predetermined duration for which a predetermined time is taken as a reference point and executes control that employs the data protection term.

BRIEF DESCRIPTION OF THE DRAWINGS

FIG. 6 shows an example of an LU management table that the host computer comprises;

FIG. 7A shows an example of a VOL table that the storage device comprises;

FIG. 7B shows an example of a CDPG table that the storage device comprises;

FIG. 9A shows an example of a device table that the management computer comprises;

FIG. 9B shows an example of a CDPG operations table that the management computer comprises;

FIG. 13 shows an example of the CDP group setting screen of the first embodiment of the present invention;

FIG. 14 shows an example of a CDPG operational state display screen of the first embodiment of the present invention;

FIG. 15 shows the VOL table and CDPG table following the transition from the state in FIG. 7;

FIG. 16 shows the CDPG operational state display screen when the storage device has made the transition from the state in FIGS. 7 and 26 to the state in FIGS. 15 and 28;

FIG. 17 shows the VOL table and CDPG table following the transition from the state in FIG. 15;

FIG. 18 shows an example of a CDPG recovery screen of the first embodiment of the present invention;

FIG. 19A shows an example of a checkpoint table that the storage device according to a first modified example of the first embodiment of the present invention comprises;

FIG. 19B shows an example of a CDPG operations table that the management computer according to the first modified example of the first embodiment of the present invention comprises;

FIG. 20 shows an example of a CDP group setting screen according to the first modified example of the first embodiment of the present invention comprises;

FIG. 22 shows an example of the CDPG operational state display screen of the first modified example of the first embodiment of the present invention;

FIG. 24A shows an example of relationship between base VOL creation time and application JNL amount prior to execution of step S1220;

FIG. 24B shows an example of relationship between base VOL creation time and application JNL amount following execution of step S1220;

FIG. 24C shows an example of relationship between base VOL creation time and application JNL amount following execution of step S1220;

FIG. 26A shows an example of a checkpoint table that the storage device comprises;

FIG. 26B shows an example of the copy VOL table that the storage device comprises;

FIG. 27 shows a modified example of the CDP group setting screen of the first embodiment of the present invention;

FIG. 28 shows the checkpoint table and copy VOL table following the transition from the state in FIG. 26; and FIG. 29 shows the checkpoint table and copy VOL table following the transition from the state in FIG. 28.

DETAILED DESCRIPTION OF THE PREFERRED EMBODIMENT

Figure 1:
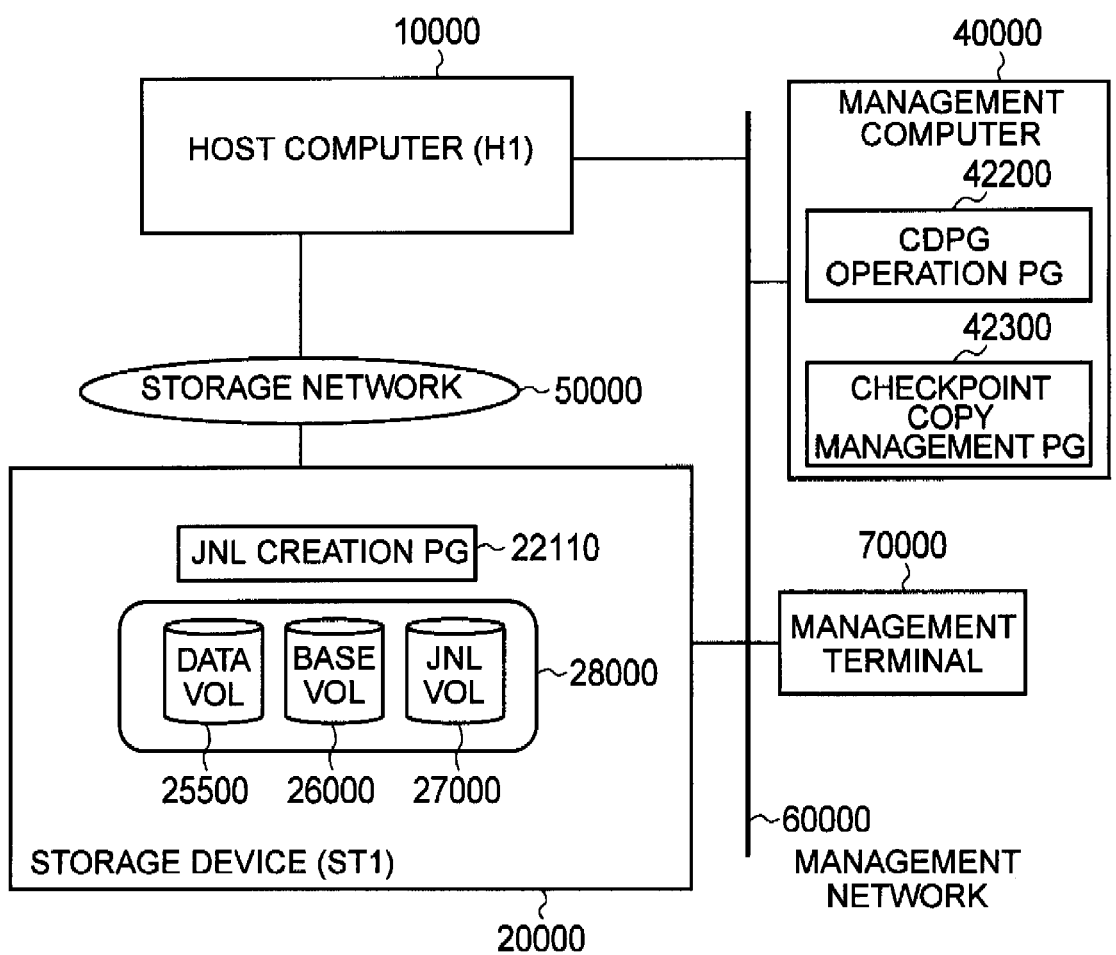
FIG. 1 shows a constitutional example of a computer system according to an embodiment of the present invention.

According to one embodiment, a storage device comprises a data volume which is a logical volume to which data constituting a write target transmitted by a higher-level device are written, a base volume which is a data image of the data volume, a journal storage region that accumulates write data to the data volume as a journal, and a storage control section that recovers the data volume by applying the journal to the base volume. The management device of the storage device comprises a data protection term acquisition section and a control section. The data protection term acquisition section acquires a data protection term which is a term in which the recovery of the data volume is protected from a predetermined duration for which a predetermined time is taken as a reference point. The control section executes control using the data protection term.

The management device may be installed in the storage device or may exist outside the storage device (may be a computer that exists outside the storage device, for example). Further, the higher-level device may be a host device or another storage device.

According to one embodiment, the data protection term is a term corresponding with the duration extending from the current time into the past.

According to one embodiment, the management device can comprise a restorable term acquisition section. The restorable term acquisition section is able to acquire a restorable term with the predetermined time (current time, for example) taken as a reference point, which is a term in which the data volume can be restored, from a time at which the base volume was created and a time recorded in journals that have accumulated in the journal volume. The control section is able to output one or more non-protected times which are one or more times contained in the restorable term but not contained in the data protection term.

According to one embodiment, the storage device can further comprise a storage region in which a plurality of check points are stored. The management device can further comprise a checkpoint acquisition section that acquires a plurality of check points (arbitrary times) stored in the storage region of the storage device. In this case, the control section is able to make a non-protected time that is output a check point that is contained in the restorable term but not contained in the data protection term.

According to one embodiment, the control section is able to display a recovery instruction acceptance screen that accepts an instruction to recover a data volume at a time desired by the administrator among a plurality of times and transmit a recovery instruction to recover the data volume at the time desired by the administrator selected from the plurality of times to the storage control section of the storage device. The display forms, on the recovery instruction acceptance screen, of one or more protection times which are one or more times that are contained in both the restorable term and the data protection term, and of the one or more non-protected times are different.

According to one embodiment, the management device can further comprise an input section for accepting an input of a value used to determine the duration; and a duration determination section that determines the duration by using the value thus input. The input section is able to accept a smaller data amount than the data amount of the journal volume constituting the journal storage region as the value. The duration determination section is able to determine the time required until the write amount per unit time with respect to the journal volume reaches the input data amount as the duration on the basis of the write amount.

According to one embodiment, the input section is able to accept the percentage of the data capacity of the journal volume constituting the journal storage region as the value. The duration determination section is able to determine the time required until the write amount reaches the data amount corresponding to the input percentage for the data amount of the journal volume as the duration on the basis of the write amount per unit time with respect to the journal volume.

According to one embodiment, the control section is able to accept the selection of a non-protected time that is desired by the administrator among the one or more non-protected times thus output and transmit a copy instruction to generate a copy of the data volume at the selected non-protected time desired by the administrator to the storage control section of the storage device. In this case, the storage control section of the storage device is able to create a copy of the data volume at the non-protected time designated by the copy instruction in response to the copy instruction.

According to one embodiment, the control section is able to display a recovery instruction acceptance screen that accepts an instruction to recover a data volume at a time desired by the administrator among a plurality of times and transmit a recovery instruction to recover the data volume at the time desired by the administrator selected from the plurality of times to the storage control section of the storage device. The plurality of times displayed on the recovery instruction acceptance screen include the one or more non-protected times and one or more protection times which are one or more times contained in both the restorable term and the data protection term and a copy time which is not contained in the restorable term but which is a non-protected time which is the target of the copy instruction. Therefore, the administrator is able to designate the copy time and, in this case, the control section is able to transmit a recovery instruction designating this copy time to the storage control section of the storage device. The storage control section is able to restore a data volume to the designated time by using the copy to restore the data volume to the designated time if the time designated by the recovery instruction is the time corresponding with the generated copy of the data volume (the copy time, for example) but by applying a journal to the base volume if the designated time is not the time corresponding with the generated copy.

According to one embodiment, the control section is able to select a non-protected time from among one or more non-protected times which are one or more times contained in the restorable term but not contained in the data protection term (not selected manually by the administrator but rather selected automatically by the control section, for example) and transmit a copy instruction to generate a copy of the data volume at the selected non-protected time to the storage control section of the storage device.

According to one embodiment, the management device can further comprise a temporal interval input section that accepts an input of a temporal interval in which the control section selects a non-protected time. The control section is able to perform the selection of a non-protected time for each temporal interval thus input.

According to one embodiment, the management device is able to further comprise a protection non-requirement input section that accepts an input to the effect that the protection at times outside the data protection term is not required. In cases where an input to the effect that protection at times outside the data protection term is not required is made, the control section is able to transmit information to that effect (an elimination request to eliminate at least one of the one or more base volumes outside the data protection term, for example) to the storage device control section of the storage device. In this case, the storage control section is able to eliminate at least one of the one or more base volumes outside the data protection term in response to the receipt of this information (the elimination request, for example). Further, in response to this information, the storage control section may eliminate base volumes other than the latest base volume among one or more base volumes outside the data protection term or may eliminate all of the one or more base volumes outside the data protection term and create a base volume at the oldest time within the data protection term.

According to one embodiment, the control section is able to transmit an elimination request to eliminate a base volume other than the latest base volume among the one or more base volumes outside the data protection term, for example, as information in cases where an input to the effect that protection at times outside the data protection term is not required is made.

According to one embodiment, the control section is able to transmit a creation request to create a base volume at the oldest time in the data protection term and an elimination request to eliminate all of the one or more base volumes outside the data protection term, for example, as information in cases where an input to the effect that protection at times outside the data protection term is not required is made.

Two or more optional embodiments among the above plurality of embodiments can also be combined to generate one embodiment.

Moreover, each of the above sections (the storage control section, data protection term acquisition section, control section, restorable term acquisition section, and so forth, for example) can be constructed by hardware, a computer program, or a combination thereof (some of these parts can be implemented by a computer program while the remainder are implemented by hardware, for example). The computer program is read to a predetermined processor and executed thereby. Further, during information processing in which the computer program is read to the processor and executed, a storage region that exists on a hardware resource such as memory may also suitably be used. Furthermore, the computer program may also be installed on a computer from a recording medium such as a CD-ROM or may be downloaded to a computer via a communication network.

An embodiment of the present invention will be described in detail hereinbelow with reference to the drawings. The present invention is not limited to this embodiment.

First Embodiment

An embodiment of the present invention will first be described. In this embodiment, in a computer system that comprises a storage device that implements CDP technology, the relationships between the restorable term, a data protection term, which is a term that is found from a predetermined duration and in which data are protected within the restorable term, and candidates for restoration target times (known as restoration times and abbreviated as CP (Check Point)) are managed, and these relationships are communicated to the system administrator. In cases where a checkpoint that is designated as important lies outside the restorable term, because the inability to perform restoration to the checkpoint by way of subsequent overwriting of the JNL is prevented, the system administrator is able to instruct the storage device to generate a copy at the checkpoint.

<(1-1) Constitution of the Computer System of this Embodiment.>

The constitution of the computer system of this embodiment will now be described. FIGS. 1 to 5 show the constitution of a computer system and the constitution of devices that are connected to the computer system and FIGS. 6 to 9 and FIG. 26 shows management information shows management information that is provided for each device.

FIG. 1 shows a constitutional example of the computer system of this embodiment.

One or more host computers 10000 and one or more storage devices 20000 are mutually connected via a storage network 50000. Further, the respective host computers 10000 and respective storage devices 20000 are connected to a management computer 40000 and a management terminal 70000 via a management network 60000.

A detailed constitutional example of the host computer 10000 will be described hereinbelow.

The storage device 20000 comprises a JNL creation PG (PG is an abbreviation for program) 22110, a data VOL (VOL is an abbreviation for logical volume) 25500, a base VOL 26000, and a JNL VOL 27000. Further, the data VOL 25500, base VOL 26000, and JNL VOL 27000 constitute a CDP group (CDPG) 28000. A detailed constitutional example of the storage device 20000 will be described subsequently.

The management computer 40000 comprises a CDPG operation PG 42200 and a checkpoint copy management PG 42300. A detailed constitutional example of the management computer 40000 will be described subsequently.

The management terminal 70000 is a terminal that is used by the system administrator to execute a program that is stored in the management computer 40000 from a remote computer. The system administrator may execute a program that is stored in the management computer 40000 by using the management terminal 70000 or may directly operate the management computer 40000 to execute the program. A detailed constitutional example of the management terminal 70000 will be described subsequently.

Further, the storage network 50000 between the host computer 10000 and the storage device 20000 may be constituted by a switch or the constitution may be such that there is a direct connection between the devices.

For the sake of an expedient description, in this embodiment, the host computer 10000 with the device ID (described subsequently) 'H1' is connected to a storage device 20000 with the device ID 'ST1' via the storage network 50000. Further, the storage network 50000 is a network that uses an FC (Fibre Channel) protocol and the management network 60000 is a network using an IP protocol. Further, the host computer 10000 with the device ID 'H1' is written as 'host computer: H1' and the storage device 20000 with the device ID 'ST1' is written as 'storage device: ST1'. Similarly, in cases where one of the targets is indicated by an identifier hereinbelow, the target is written using ':'.

Figure 2:
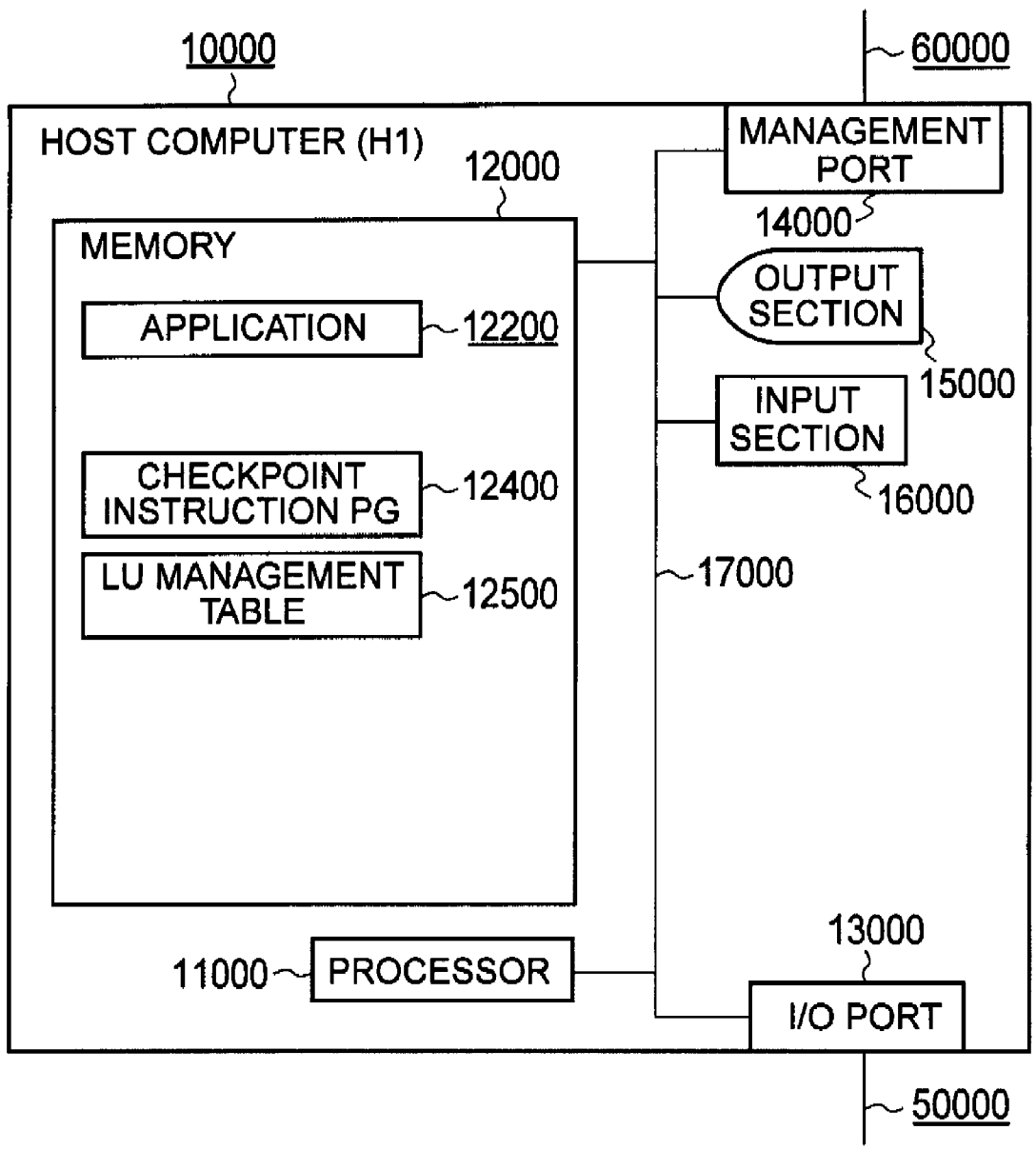
FIG. 2 shows a constitutional example of a host computer according to an embodiment of the present invention.

FIG. 2 shows a constitutional example of the host computer 10000 of this embodiment.

The host computer 10000 comprises a processor 11000, a memory 12000, one or more I/O ports 13000 for a connection to the storage network 50000, a management port 14000 for a connection to the management network 60000, an output section 15000 of a display device for outputting the processing result, and an input section 16000 such as a keyboard or mouse, which are mutually connected via an internal bus 17000.

The memory 12000 stores an OS (Operating System) (not shown) and an application 12200 for performing the processing that accompanies the data access for reading data stored in the data VOL 25500 of the storage device 20000 and writing data to the data VOL 25500. Further, the memory 12000 stores a checkpoint instruction PG 12400 that works with the JNL creation PG 22110 that the storage device 20000 comprises. In addition, the memory 12000 stores an LU management table 12500 that manages an LU (Logical Unit) that corresponds to data VOL 25500 which is data-accessed by the host computer 10000. This program and management table are loaded from a storage medium (not shown) such as a hard disk and the processor 11000 references this program and table and so forth.

Figure 3:
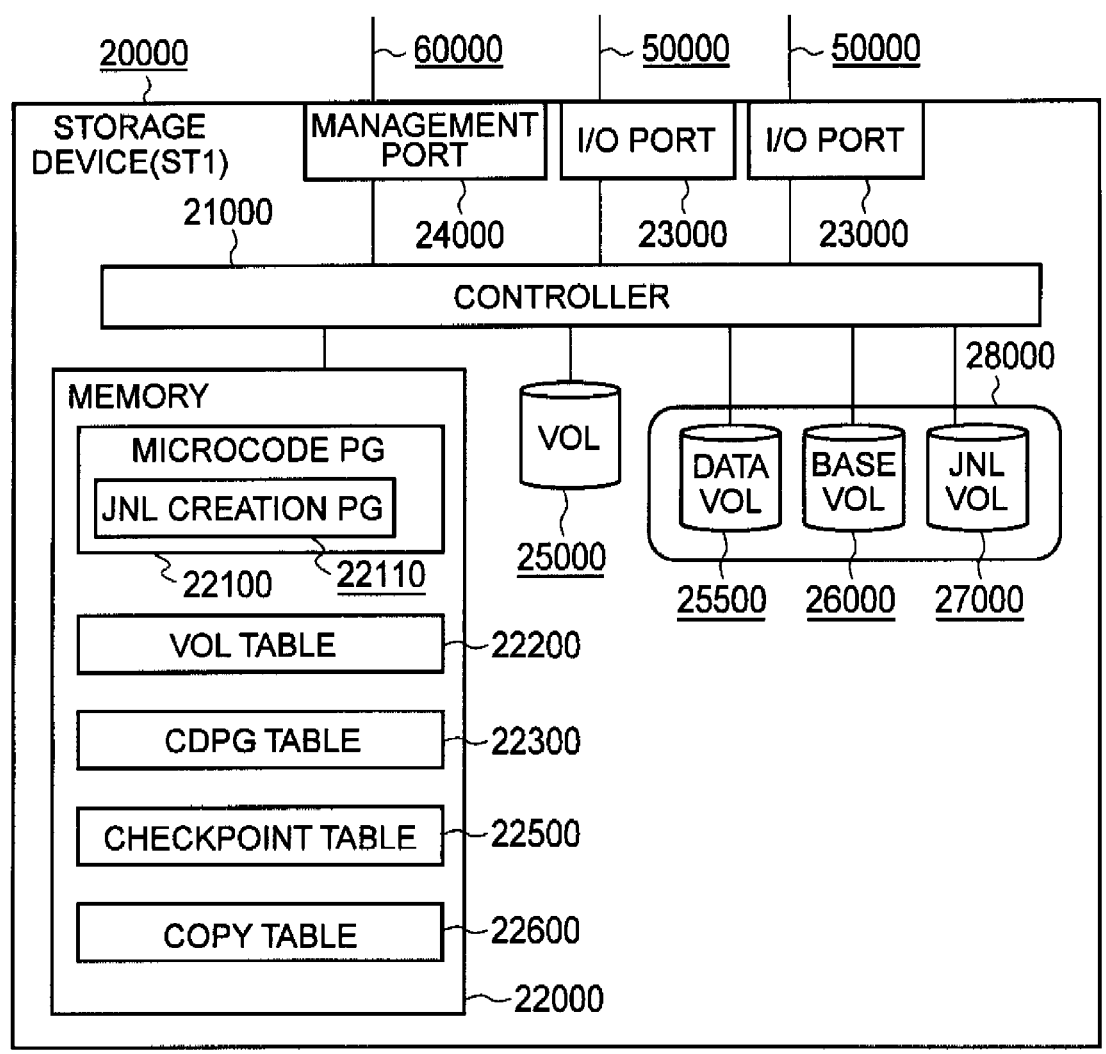
FIG. 3 shows a constitutional example of the storage device according to an embodiment of the present invention.

FIG. 3 shows a constitutional example of the storage device 20000 of this embodiment.

The storage device 20000 comprises a controller 21000 that performs control within the storage device 20000, a memory 22000, one or more I/O ports 23000 for a connection to the storage network 50000, a management port 24000 for a connection to a management network 60000, one or more VOL 25000 that can be provided as storage regions in the host computer 10000, one or more data VOL 25500, one or more base VOL 26000, and one or more JNL VOL 27000. The one or more data VOL 25500, one or more base VOL 26000, and one or more JNL VOL 27000 are formed as a result of allocating some of the data VOL 25500 and constitute the aforementioned CDPG 28000. The storage device 20000 comprises one or more CDPG 28000. The constitution of the CDPG 28000 that the storage device 20000 comprises (the combination of data VOL 25500, base VOL 26000, and JNL VOL 27000) and the constitution of the checkpoint created by the CDPG are collectively called the 'CDP constitution' hereinbelow. The aforementioned plurality of elements of the storage device 20000 are mutually connected via the controller 21000.

The memory 22000 stores a microcode PG 22100 that performs control within the storage device 20000. The JNL creation PG 22110 exists as part of the microcode PG 22100. An overview of the operation of the JNL creation PG 22110 will be described subsequently.

Furthermore, the memory 22000 stores a VOL table 22200 that manages the VOL 25000, a CDPG table 22300 and checkpoint table 22500 which are used by the JNL creation PG 22110 to manage the CDP constitution, and a copy VOL table 22600 for managing information related to the copying of data of the VOL 25000. These tables and programs are loaded from a storage medium such as a hard disk (not shown) during storage device startup and processed by the controller 21000.

The number of I/O ports 23000 is decided arbitrarily from the number of and capacities of the VOL 25000, data VOL 25500, base VOL 26000 and JNL VOL 27000. Furthermore, the VOL 25000, data VOL 25500, base VOL 26000, and JNL VOL 27000 may be formed as a RAID configuration involving a plurality of hard disks or may be formed by one hard disk.

Figure 4:
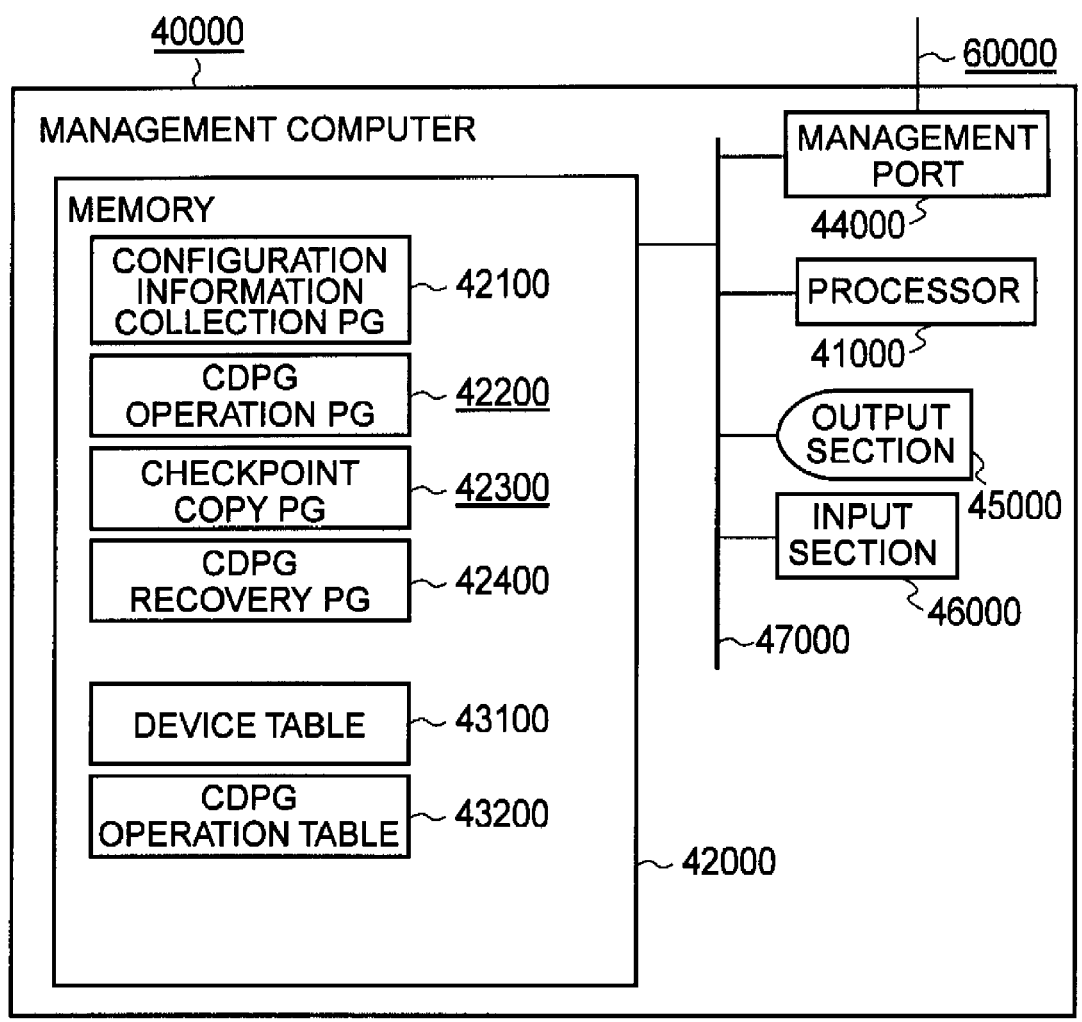
FIG. 4 shows a constitutional example of a management computer according to an embodiment of the present invention.

FIG. 4 shows a constitutional example of the management computer 40000 of this embodiment.

The management computer 40000 comprises a processor 41000, a memory 42000, a management port 44000 for a connection to the management network 60000, an output section 45000 such as a display device for outputting a processing result, and an input section 46000 such as a keyboard or mouse or the like, which are connected to one another via an internal bus 47000.

The memory 42000 stores a device table 43100 for specifying a configuration information collection PG 42100, the CDPG operation PG 42200, the checkpoint copy PG 42300, a CDPG recovery PG 42400, and the host computer 10000 and the storage device 20000 for which the management computer 40000 is the management target, and a CDPG operation table 43200 for managing the CDPG that is used by the CDPG operation PG 42200, the checkpoint copy PG 42300, and the CDPG recovery PG 42400. These programs and tables are loaded to the memory 42000 from a storage medium (not shown) such as a hard disk by the processor 41000 and executed or referenced. Further, although not shown, the memory 42000 also stores an OS that is loaded from a storage medium. The processor 41000 executes the OS.

Figure 5:
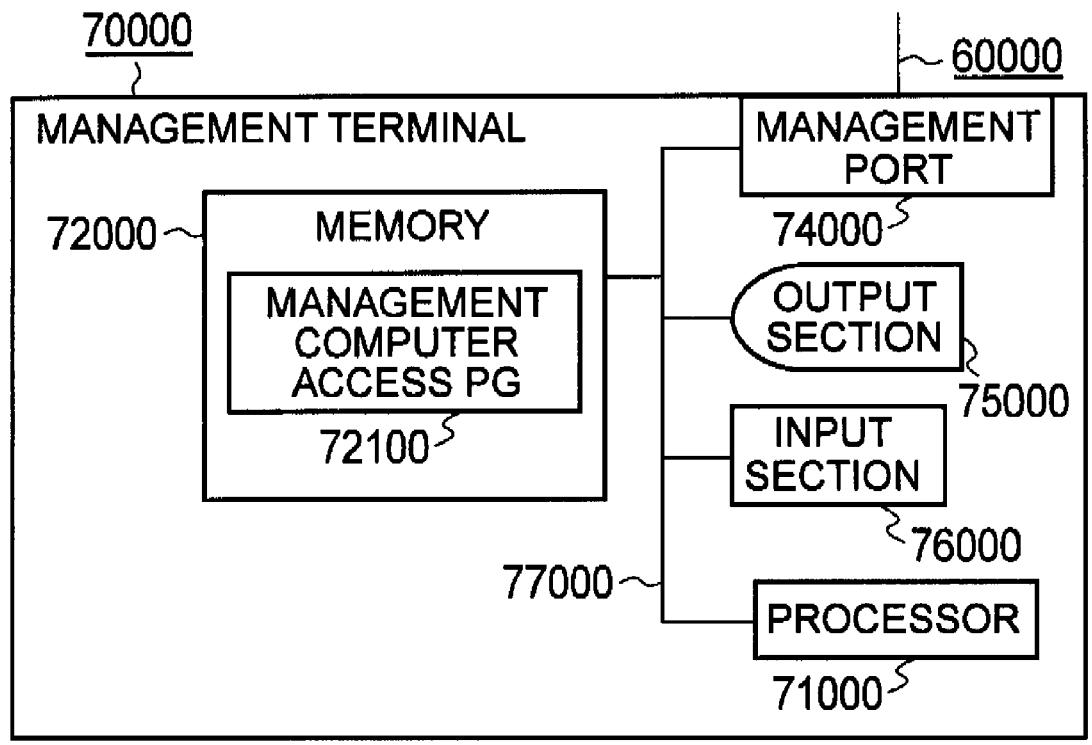
FIG. 5 shows a constitutional example of the management computer according to an embodiment of the present invention.

FIG. 5 shows a constitutional example of the management terminal 70000 of this embodiment.

The management terminal 70000 comprises a processor 71000, a memory 72000, a management port 74000 for a connection to the management network 60000, an output section 75000 such as a display device or the like for outputting a processing result, and an input section 76000 such as a keyboard or mouse, which are connected to one another by an internal bus 77000.

The memory 72000 stores a management computer access PG 72100 for controlling the I/O for the execution of a program on the management network 60000 from a remote point. This program 72100 is loaded to memory 72000 from a storage medium (not shown) such as a hard disk by the processor 71000 and executed. Furthermore, as per the case of the management computer 40000, an OS is also stored in the memory 72000 and the OS is executed by the processor 71000.

FIG. 6 shows an example of the LU management table 12500 that the host computer 10000 comprises.

This table 12500 manages the LU corresponding to the data VOL 25500 that can be data-accessed by the host computer 10000. The LU management table 12500 is constituted by an LU ID field 12505 for registering an LU ID which is an identifier for uniquely specifying an LU in the host computer 10000, a capacity field 12510 for registering the capacity of the LU, and a VOL information field 12515 for registering detailed information relating to the data VOL 25500 of the storage device 20000 corresponding to the LU, for example. The VOL information field 12515 registers values that can be acquired by issuing an SCSI Inquiry command to the LU, for example. Further, the constitution of the table 12500 is not limited to that above. This table 12500 may also be constituted by some of the above fields or constituted in a format in which other new fields are added. The same is also true for the other tables (FIGS. 7 to 9 and FIG. 26).

FIG. 7A shows an example of the VOL TABLE 22200 that the storage device 20000 comprises.

This table 22200 is constituted by a VOL ID field 22210 for registering a VOL ID which is an identifier for uniquely specifying the VOL 25000 in the storage device 20000, a used field 22220 that indicates whether the VOL 25000 has been used, and a capacity field 22230 for registering the capacity of the VOL 25000, for example. 'Used', which indicates that the VOL 25000 is 'used' or 'unused', for example, is registered in the used field 22220.

FIG. 7B shows an example of the CDPG table 22300 that the storage device 20000 comprises.

This table 22300 is constituted by a CDPG ID field 22310 for registering the CDPG ID which is an identifier for uniquely specifying the CDPG 28000, a data VOL field 22320 for registering one or more data VOL 25500 (can be designated by using the VOL ID) which are targets for creating the JNL (the 'JNL creation targets' hereinbelow), a base VOL field 22330 for registering one or more base VOL 26000 (can be designated using the VOL ID as mentioned earlier) which are targets to which the JNL are applied when restoring data and a JNL VOL field 22340 for registering one or more JNL VOL 27000 that store the JNL (can be designated using a VOL ID as mentioned earlier). The manner in which the JNL creation PG 22110 uses this table 22300 will be described subsequently.

FIG. 26A shows an example of the checkpoint table 22500 that the storage device 20000 comprises.

Information ('checkpoint information' hereinbelow) relating to the checkpoint created as a result of the system administrator and the JNL creation PG 22110 itself issuing an instruction is registered in the table 22500. The table 22500 is constituted by a CDPG ID field 22510 for registering the CDPG ID of the CDPG 28000 which is the target of the backup and recovery operation by the CDP technology ('CDP operation' hereinbelow), the data VOL field 22520 for registering the VOL ID of the data VOL 25500 which is the target for creating the JNL, a checkpoint ID field 22530 for registering the checkpoint ID which is an identifier for uniquely specifying a checkpoint within the storage device 20000, a sequence number field 22540 for registering new JNL sequence numbers (described subsequently) at the times of the checkpoint; a base VOL field 22550 for registering the VOL ID of the base VOL 26000 in cases where the checkpoint holds the base VOL 26000, a time field 22560 for registering the time of the checkpoint, and a copy state field 22570 for registering the copy state indicating whether a copy of data has been generated at the checkpoint. States registered in the copy state field 22570 include 'copied', which indicates that a copy has been generated, 'copy in progress', which indicates the fact that a copy is being generated, 'not copied', which indicates that a copy has not yet been generated, and 'not required', which indicates the fact that there is no need to generate a copy, for example. Further, the role of the sequence numbers and base VOL 26000 and the manner in which the JNL creation program 22110 uses the table will be described subsequently.

FIG. 26B shows an example of the copy VOL table 22600 that the storage device 20000 comprises.

This table 22600 is constituted by a copy source VOL field 22610 for registering a VOL ID of the copy source VOL 25000 (data VOL 25500), a copy destination VOL field 22620 for registering the VOL ID of the copy destination VOL 25000, and a time field 22630 that indicates whether data of a particular time in the copy source VOL 25000 are copied, for example. In this embodiment, the time of any checkpoint is set in the time field 22630. Suppose that the microcode PG 22100 of the storage device 20000 copies data for the time registered in the time field 22630 of the copy source VOL 25000 to the copy destination VOL 25000 on the basis of an entry registered in the table 22600 (one of the combination of values of the field constituting the table) to the copy-destination VOL 25000. As the method of copying, for example, a method according to which addresses from the start address to the end address of the copy source VOL 25000 are divided up using specified blocks and the data of the respective blocks are copied to the copy-destination VOL 25000 sequentially from the block containing the start address to the block containing the end address may be considered.

Figures 8A, 8B:
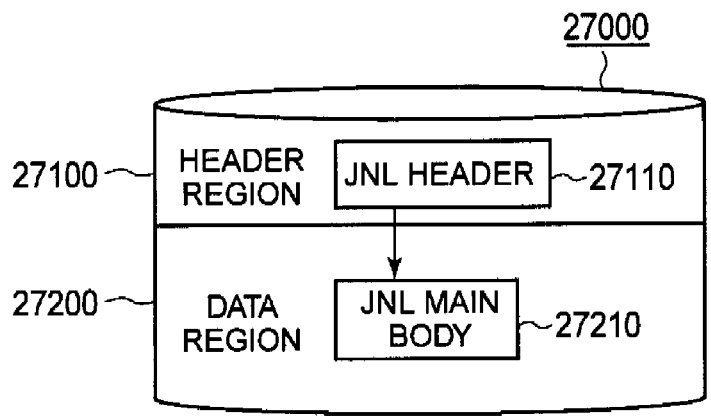
FIG. 8A shows a constitutional example of a JNL VOL of the first embodiment of the present invention.
FIG. 8B shows the specific content of the information that is contained in a JNL header.

FIG. 8A shows a constitutional example of the JNL VOL 27000 of this embodiment.

JNL VOL 27000 comprises a data region 27200 that accumulates, as a JNL main body 27210, write data (host write data) from the host computer 10000 with respect to the data VOL 25500 of the JNL creation target and a header region 27100 for holding information relating to the JNL main body 27210 stored in the data region 27200 ('JNL header' hereinbelow) 27110. When the host write data are written to the data VOL 25500, the JNL creation PG 22110 accumulates the host write data in the data region 27200 as the JNL main body 27210 and creates the JNL header 27110 that corresponds with the JNL main body 27210, and stores the JNL header 27110 thus created in the header region 27100. The JNL is the result of uniting the JNL main body 27210 and the JNL header 27110.

FIG. 8B shows the specific content of the information contained in the JNL header 27110.

The JNL header 27110 contains, for example, information such as a sequence number 27111 which indicates the sequence of the host write data (the sequence in which the host write data are received by the storage device 20000 or the sequence in which these data are processed, or the like, for example), a creation time 27112 that indicates the time at which the host write data are written, a data VOL address 27113 that indicates the start address of the region in which the host write data are stored in the data VOL 25500, the data length 27114 which indicates the data length of the host write data, and the JNL VOL data region address 27115 that indicates the start address of the region in which the JNL main body 27210 corresponding with the host write data are stored in the data region 27200. In other words, by referencing the JNL header 27110, it can be seen that the JNL main body 27210 is stored in the region that corresponds with the length of the data length 27114 from a position designated by the JNL VOL data region address 27115 of the data region 27200. Further, in FIG. 8B, the data VOL address 27113 and JNL VOL data region address 27115 are indicated by the number of bytes from the start address of the respective VOL. The values in brackets in FIG. 8B indicate the number of bytes.

FIG. 9A shows an example of the device table 43100 that the management computer 40000 comprises.

The table 43100 is constituted, for example, by a device ID field 43110 for registering a device ID which is an identifier for uniquely specifying a device in the computer system (host computer 10000, storage device 20000, management computer 40000, and management terminal 70000 and so forth), a device type field 43120 for registering the device type of the device, a device information field 43130 for registering detailed information such as the header name of the device, the model name, and the serial number or the like, and an IP address field 43140 for registering the IP address for communicating with the management port of the device. Further, the information registered in these fields may be input beforehand by the system administrator from the management computer 40000 or management terminal 70000 or may be automatically acquired by using a predetermined function (name service or the like) provided by the storage network 50000 or management network 60000.

FIG. 9B shows an example of the CDPG operation table 43200 that the management computer 40000 comprises.

This table 43200 is constituted, for example, by a storage device field 43210 for registering the device ID that indicates the storage device 20000 in which the CDPG 28000 which is the target of the CDP operation is set, a CDPG ID field 43220 for registering the CDPG ID of the CDPG 28000, a CDPG nickname field 43225 for registering a predetermined name ('CDPG nickname' hereinbelow, for example) chosen by the system administrator for the CDPG 28000, a data VOL field 43230 for registering the VOL ID of the data VOL 25500 protected by the CDPG 28000, a JNL VOL capacity field 43240 that indicates the capacity of the JNL VOL 27000 constituting the CDPG 28000 ('JNL VOL capacity' hereinbelow), the data protection term field 43250 which indicates the data protection term of the CDPG 28000, and a checkpoint instruction interval field 43260 which indicates the time taken for the CDPG 28000 to instruct the checkpoint at regular intervals ('checkpoint instruction interval' hereinbelow). The specific usage method and data protection term of the table 43200 will be described subsequently.

The constitution of the computer system of this embodiment was described hereinabove.

The operation of the respective devices constituting the computer system will be described hereinbelow. In cases where the computer program is the subject, processing is performed by a processor or controller that actually executes the computer program.

<(1-2) Overview of the Operation of the JNL Creation PG 22110 in the Storage Device 20000.>

Before describing the CDP constitution management processing of this embodiment, an overview of the operation of the JNL creation PG 22110 in the storage device 20000 will be described.

First, in order to permit recovery using the JNL of the VOL 25000 with which the host computer 10000 is provided, the system administrator issues an instruction to the storage device 20000 and registers a set of the data VOL 25500, the base VOL 26000 and JNL VOL 27000 in the CDPG table 22300 of the storage device 20000. This set is registered as shown in FIG. 7B in this embodiment.

Thereafter, the system administrator instructs the start of the acquisition of the JNL of the data VOL 25500 thus registered. For example, the system administrator issues an instruction to the CDPG operation PG 42200 on the management computer 40000 and, as a result of the CDPG operation PG 42200 that has received the instruction issuing a signal for the start of JNL acquisition to the JNL creation PG 22110 of the storage device 20000, an instruction for the start of JNL acquisition with respect to the data VOL 25500 of the CDPG 28000 registered in the CDPG table 22300 is issued.

Thereafter, when writing is performed by the host computer 10000, the JNL creation PG 22110 in the storage device 20000 writes host write data from the host computer 10000 to the data VOL 25500 identified by the host computer 10000 and accumulates the JNL corresponding with the host write data to the JNL VOL 27000. Further, the JNL creation PG 22110 creates a duplicate of the data VOL 25500 at an arbitrary point in time after the time at which the instruction for the start of JNL acquisition was issued ('JNL acquisition start time point' hereinbelow). The duplicate corresponds to the base VOL 26000. As a result, the JNL creation PG 22110 is able to restore the data VOL 25500 by utilizing the base VOL 26000 and the JNL that have accumulated at a point in time after the creation of the base VOL 26000. Further, the base VOL 26000 may also be created at a plurality of time points and, in this case, a plurality of base VOL 26000 are present.

Furthermore, the JNL VOL 27000 that stores the JNL corresponding with the host write data is acquired by referencing the CDPG table 22300. For example, it can be seen that, in cases where host write data are written to the LU:LU1 of the host computer: H1, for example, by referencing the CDPG table 22300, the JNL VOL 27000 in which the JNL is stored is the JNL VOL: st1v11, JNL VOL: st1v12, or JNL VOL: st1v13, the JNL corresponding with the JNL VOL 27000 are accumulated. Further, it can be seen by referencing the LU management table 12500 that the LU: LU1 corresponds with the data VOL: st1v01 of the storage device: ST1.

In cases where a checkpoint is created after the start of JNL acquisition, the system administrator instructs the checkpoint instruction PG 12400 provided in the host computer 10000 to create the checkpoint by designating an LU on the host computer 10000. The checkpoint instruction PG 12400 specifies a data VOL 25500 corresponding with the LU by referencing the LU management table 12500 and issues an instruction to create a checkpoint for the CDPG 28000 that has the data VOL 25500 as a constituent element with respect to the JNL creation PG 22110. For example, in cases where the creation of the checkpoint with respect to the LU:LU1 of the host computer: H1 is instructed by the system administrator, the checkpoint instruction PG 12400 specifies the data VOL: st1v01 that corresponds with the LU:LU1 and storage device: ST1 comprising the LU:LU1 by referencing the LU management table 12500 and instructs the JNL creation PG 22110 in the storage device: ST1 to create a checkpoint for the CDPG 28000 (CDPG: g01) of which the data VOL: st1v01 is a constituent element.

The JNL creation PG 22110 that received the instruction to create the checkpoint performs checkpoint creation, that is, registers a new entry in the checkpoint table 22500. For example, a checkpoint is created as shown in FIG. 26A (seven checkpoints are created in FIG. 26A) and, in this case, it is shown that the checkpoint with the checkpoint ID: g01_cp01 is a checkpoint that was created at 08:10 on Jan. 1, 2007, the sequence number of the JNL at this time is 100, and the base VOL 26000 is the base VOL: st1v30. Further, the JNL creation PG 22110 may separately create a base VOL 26000 which is a duplicate of the data VOL 25000 at the time of the checkpoint as a result of an instruction by the system administrator or a judgment by the JNL creation PG 22110. As a result of the separate creation of the base VOL 26000, although the resources of the storage capacity or the like in the storage device 20000 consume excess power, because the JNL amount applied during recovery is reduced, the RTO can be shortened. For example, as shown in FIG. 26A, a new base VOL: st1v31 is created at checkpoint: g01_cp03. Therefore, for checkpoints from checkpoint:g01_cp01 to checkpoint: g01_cp02, recovery is performed by utilizing a base VOL: st1v30 and, for the checkpoints from checkpoint:g01_cp03 to the checkpoint: g01_cp04, recovery is performed by utilizing the base VOL:st1v31.

In cases where the system administrator wishes to recover the data VOL 25500, the system administrator issues a recovery instruction to the CDPG operation PG 42200 and, as a result of the CDPG operation PG 42200 which receives this instruction issuing a signal for the start of recovery to the JNL creation PG 22110 of the storage device 20000, recovery of the CDPG 28000 registered in the CDPG table 22300 is started. Here, the system administrator designates an LU of the host computer 10000 or a data VOL 25500 of the storage device 20000 via the CDPG operation PG 42200 to acquire checkpoint information from the JNL creation PG 22110 of the storage device 20000 and, based on the checkpoint information, determines to which checkpoint time the data VOL 25500 is to be restored. Following this determination, the system administrator designates an LU of the host computer 10000 or a data VOL 25500 of the storage device 20000 and the checkpoint determined above from the CDPG operation PG 42200 of the management computer 10000 and issues a recovery instruction. The CDPG operation PG 42200 specifies the storage device 20000 that corresponds with the LU by referencing the LU management table 12500 in the host computer 10000 (can be acquired via the management network 60000 from the host computer 10000) and issues an instruction to the JNL creation PG 22110 in the storage device 20000 to restore the data of the data VOL 25500 to the time of the designated checkpoint. For example, because the system administrator restores the data of the LU: LU1 of the host computer: H1 to data at the time point 8:40 on Jan. 1, 2007, when recovery is instructed by designating the set LU:LU1 and checkpoint:g01_cp02 for the CDPG operation PG 42200, the CDPG operation PG 42200 issues an instruction to the JNL creation PG 22110 in the storage device 20000 to restore the data of the data VOL: st1v01 to the time of checkpoint: g01_cp02.

The JNL creation PG 22110 in the storage device 20000 that received the recovery instruction references the checkpoint table 22500 and judges whether data can be restored to the designated checkpoint time by overwriting a particular base VOL 26000 with a given amount of the JNL. More specifically, the JNL creation PG 22110 references entries in which the base VOL 26000 was created which are entries for checkpoints designated by the checkpoint table 22500 and earlier checkpoints in order to detect the base VOL (base-vol) which is the JNL application target, the sequence number of the final JNL, that is, the sequence number (num1) of the latest JNL at the time of the designated checkpoint, and the sequence number of the first JNL, that is, the sequence number (num2) of the latest JNL at the time of the checkpoint at which the base-vol was created. Further, restoration of the data to the time of the designated checkpoint is performed by overwriting the base-vol with the JNL of the sequence numbers from num2 to num1. Further, the restored data may be created for the base VOL 26000 and, by preparing a VOL 25000 that differs from that of the base VOL 26000 and copying data to the VOL 25000, the restored data may be created.

As a result of the above processing being performed, data of the data VOL 25500 is restored to the time of an arbitrary checkpoint.

An overview of the operation of the JNL creation PG 22110 in the storage device 20000 was provided hereinabove.

The reasons for restoring data with checkpoint times serving as reference points will now be described. For example, the cause of stoppage of the computer system is thought to be a fault with the DBMS which is run by the host computer 10000, of an application which is not DBMS, or of OS software or other software may be considered. In the case of such a fault, all the times within the restorable term based on CDP application are not necessarily limited to those times which are useful as the times for restoring data. This is because the DBMS or other software employs the memory 12000 of the host computer 10000 as a data buffer. Hence, there are cases where the data written to the data VOL 25500 are data undergoing DBMS processing or other processing, that is, a portion of the write data that have accumulated in the data buffer and there is data non-conformance even when the operation is re-started after such data are restored.

Therefore, in the actual CDP operation, data in the memory 12000 of the host computer 10000 that the DBMS or the like uses as a data buffer are forcibly output to the data VOL 25500. This is called freezing of the application. Because a large number of DBMS applications and so forth are provided with commands or the like for freezing an application, as long as the time at which the freezing is performed is recorded as the checkpoint, recovery is possible without data non-conformance occurring. In this embodiment, a checkpoint is created at the time at which such application freezing is performed.

<(1-3) CDP Constitution Management Processing of this Embodiment.>

The processing to perform a CDP operation by managing the CDP constitution of this embodiment (CDP constitution management processing) will be described next.

The CDP constitution management processing is implemented by the CDPG operation PG 42200 in the management computer 40000, the checkpoint copy PG 42300, and the CDPG recovery PG 42400.

The CDPG operation PG 42200 is a program that registers the CDPG 28000 comprising the data VOL 25500 of the storage device 20000 or the plurality of LU of the host computer 10000 established by the system administrator as targets for the CDP operation and performs the CDP operation.

Furthermore, the checkpoint copy PG 42300 is a program that is executed as a result of being called by the CDPG operation PG 42200 and which generates a copy of the data of the checkpoint designated by the system administrator among the checkpoints held by the CDPG 28000.

Further, the CDPG recovery PG 42400 is a program that is executed as a result of being called by the CDPG operation PG 42200 and which performs recovery of the data VOL 25500 constituting the CDPG 28000 designated by the system administrator.

Figure 10:
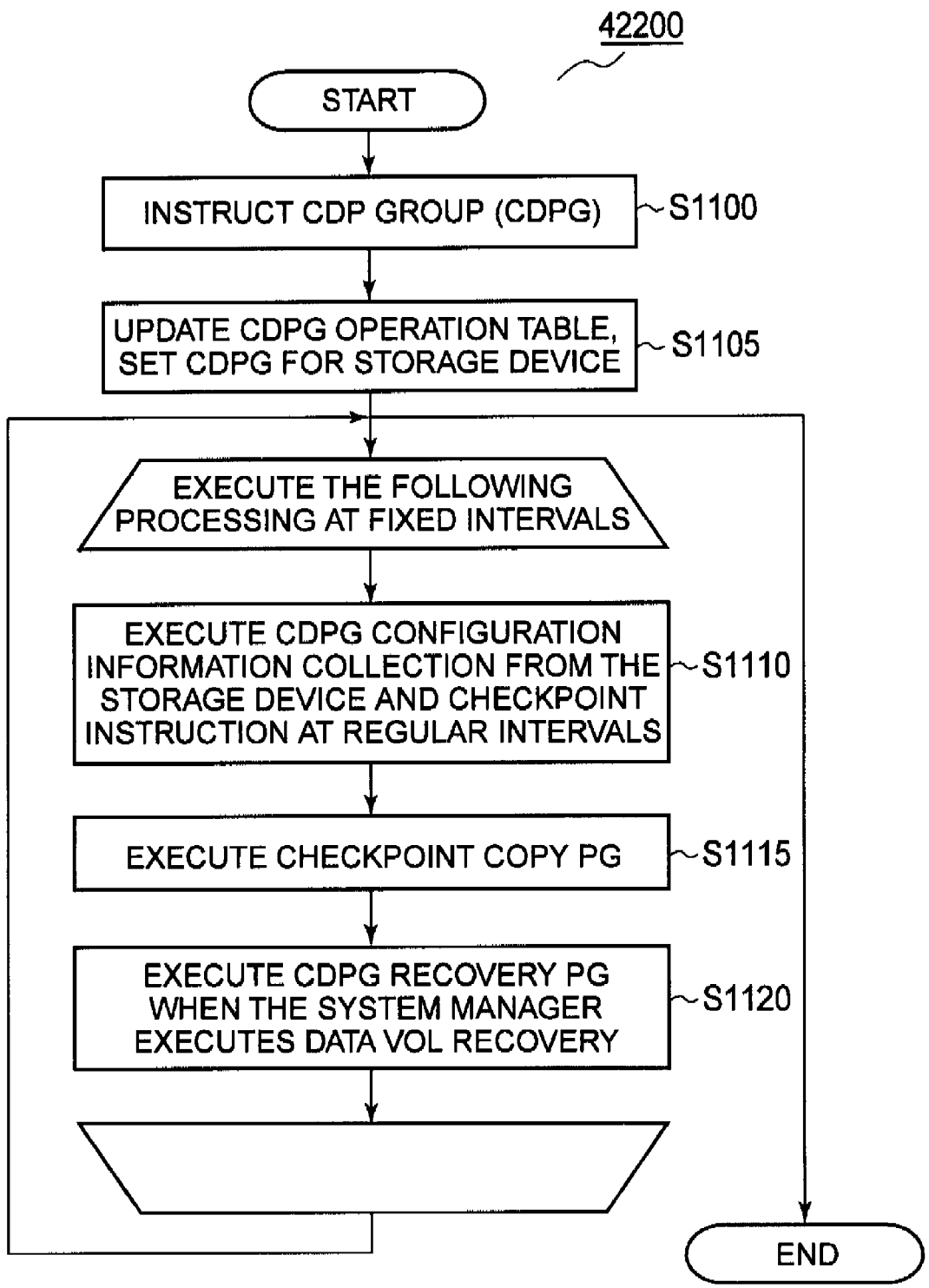
FIG. 10 is a flowchart of the processing that is executed by the CDPG operations PG.
Figure 11:
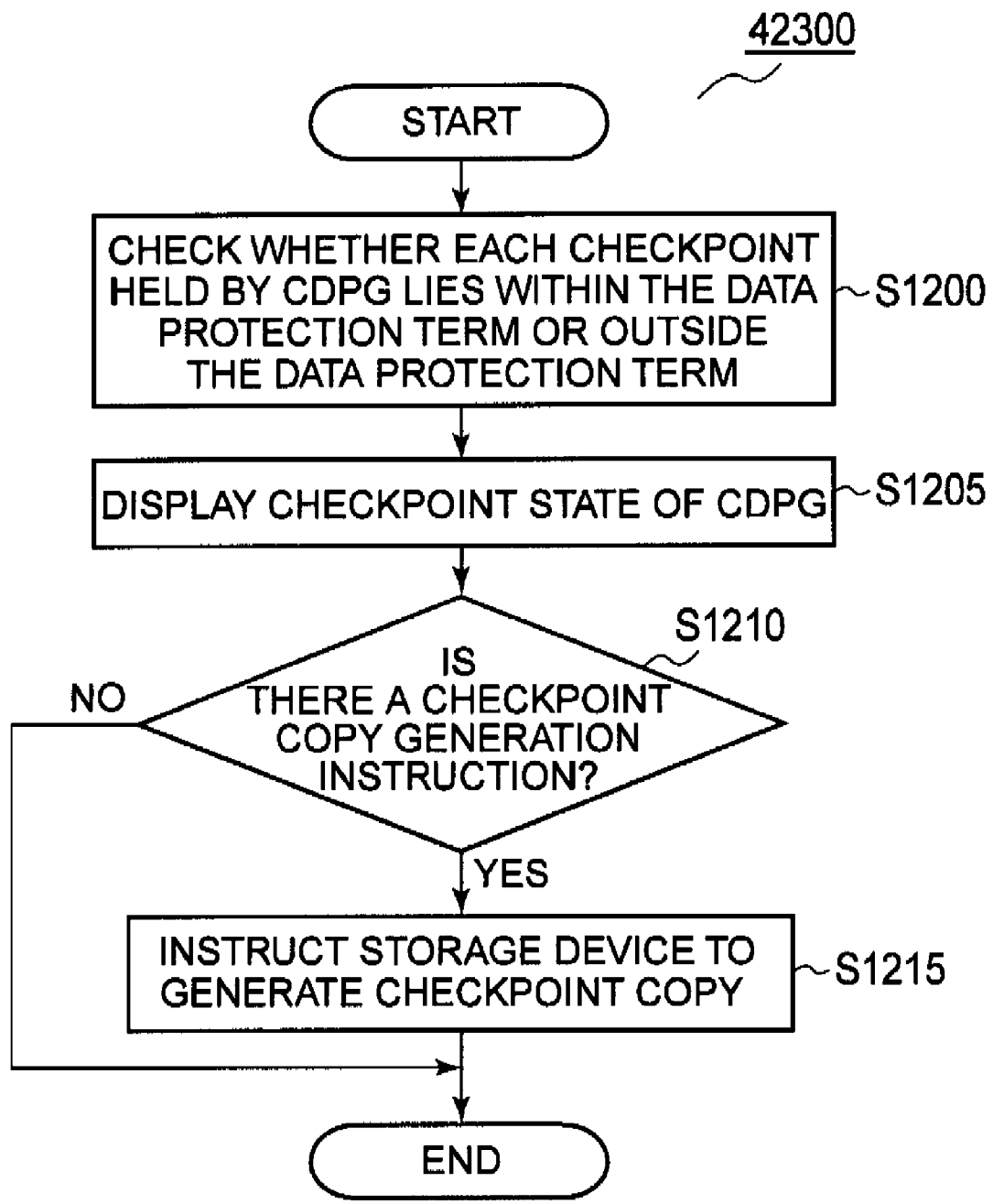
FIG. 11 is a flowchart of the processing executed by the checkpoint copy PG.
Figure 12:
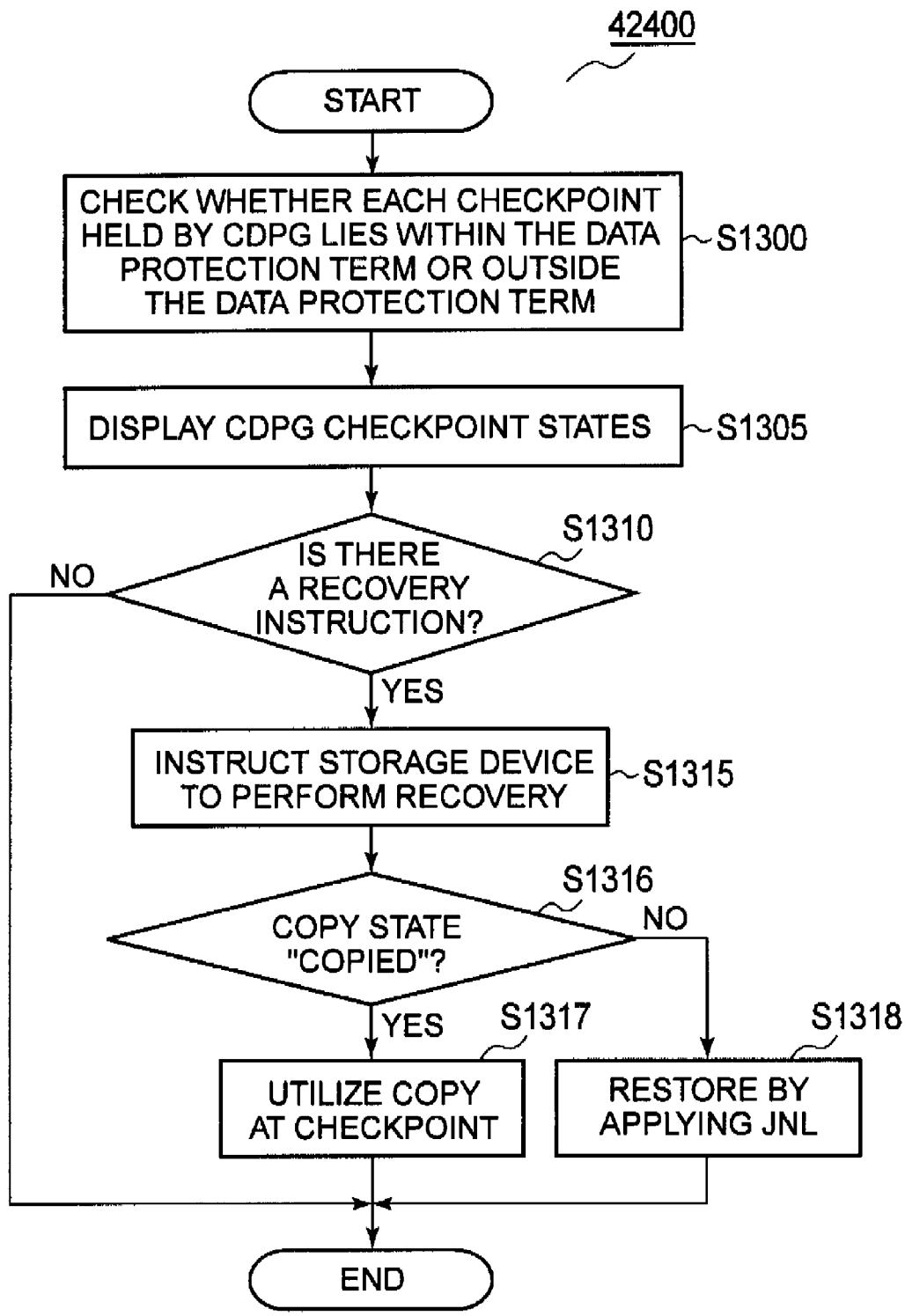
FIG. 12 is a flowchart of the processing executed by the CDPG recovery PG.

FIGS. 10 to 12 show flowcharts for the processing that is executed by the respective programs.

FIG. 10 is a flowchart for the processing executed by the CDPG operation PG 42200.

First, a display for setting the CDPG 28000 is produced and the setting request of the CDPG 28000 is received from the system administrator (step S1100). In specific terms, the CDPG operation PG 42200 creates a new entry for the CDPG operation table 43200 and, therefore, receives information indicating the storage device 20000, a CDPG nickname, information indicating the data VOL 25500, the JNL VOL capacity, the data protection term, and the checkpoint instruction interval. Here, the data VOL 25500 may be directly designated by the data VOL 25500 of the storage device 20000 or may be designated by the set of the host computer 10000 and an LU of the host computer 10000. Further, the JNL VOL capacity and data protection term may be designated by the capacity (300 GB, for example) or may be designated by a temporal interval (three hours, for example). The association between the capacity and the duration is made as follows, for example. In other words, by empirically determining the approximate data amount that is written per unit time from the previous results during operation, the approximate data amount (capacity) that is written during this interval from the designated duration is calculated or, the other way around, the approximate duration required for data corresponding with the capacity to be written is calculated from the designated capacity. Further, the data protection term may be designated by the percentage with respect to the JNL VOL capacity (80%, for example). The information indicating the storage device 20000, the information indicating the data VOL 25500, and the JNL VOL capacity are forcibly set by the system administrator. A value that is preset by the CDPG operation PG 42200 may be used as the value of the other information.

Thereafter, the CDPG operation PG 42200 updates the CDPG operation table 43200 together with the information acquired in the step S1100 and sets the CDPG 28000 with respect to the JNL creation PG 22110 of the storage device 20000 (step S1105) More specifically, the CDPG operation PG 42200 issues an instruction to create, with the information acquired in step S1100 serving as the source, a new entry for the CDPG operation table 43200 and to create a new entry for the CDPG table 22300 of the storage device 20000 by communicating the information relating to the CDPG 28000 to the JNL creation PG 22110. Thereafter, the CDPG operation PG 42200 issues a signal for the start of JNL acquisition. As a result, the storage device 20000 starts the JNL acquisition with respect to the CDPG 28000 registered in the CDPG table 22300.

Thereafter, the CDPG operation PG 42200 executes the processing from subsequently described step S1110 to step S1120 at fixed intervals while receiving an instruction to end the CDP constitution management processing from the system administrator.

First, the CDPG operation PG 42200 executes the collection of CDPG configuration information from the storage device 20000 and checkpoint instruction at regular intervals for the CDPG 28000 registered in the CDPG operation table 43200 (step S1110). The CDPG operation PG 42200 is able to cause the configuration information collection PG 41100 to collect CDPG configuration information. Here, the CDPG configuration information is information that is managed by the CDPG table 22300 of the storage device 20000, the checkpoint table 22500, and the copy VOL table 22600 and the checkpoint information contained in the information collected in this step may be accumulated in the memory 42000 of the management computer 40000. As a result of the accumulation of information, the checkpoint copy PG 42300 and the CDPG recovery PG 42400 described subsequently are able to acquire CDPG configuration information from the memory 42000.

The CDPG operation PG 42200 then executes the checkpoint copy PG 42300 (step S1115).

Finally, when the system administrator wishes to execute recovery of the data VOL 25500, the CDPG operation PG 42200 executes the CDPG recovery PG 42400 in accordance with an instruction from the system administrator (step S1120).

The flowchart of the processing executed by the CDPG operation PG 42200 was described hereinabove.

FIG. 11 is a flowchart for processing that is executed by the checkpoint copy PG 42300.

First, the checkpoint copy PG 42300 checks whether each checkpoint held by the CDPG 28000 lies within the data protection term or outside the data protection term (step S1200). More specifically, the checkpoint copy PG 42300 acquires, from the JNL creation PG 22110 of the storage device 20000, a JNL header 27110 relating to the latest JNL that has been accumulated in the JNL VOL 27000, a JNL header 27110 relating to the oldest JNL that has been accumulated in the JNL VOL 27000, and the JNL headers 27110 relating to the JNL that correspond with all the checkpoints. Here, the method of judging whether a checkpoint lies within or outside the data protection term will be described. When the data protection term is defined by capacity, if the difference between the JNL VOL data region address 27115 of the latest JNL and the JNL VOL data region address 27115 of the JNL of the judgment target checkpoint (the difference of the values in brackets) is smaller than the capacity of the data protection term, it is judged that the checkpoint lies within the data protection term and, if the difference is larger than the capacity of the data protection term, it is judged that the checkpoint lies outside the data protection term. Further, in cases where the data protection term is defined using time, if the difference between the creation time 27112 of the latest JNL and the creation time 27112 of the JNL of the judgment target checkpoint is smaller than the data protection term, it is judged that the checkpoint lies within the data protection term and, if the difference between the creation time 27112 of the latest JNL and the creation time 27112 of the JNL of the judgment target checkpoint is larger than the data protection term, it is judged that the checkpoint lies outside the protection term. Such a judgment is implemented for all the checkpoints.

Thereafter, the checkpoint copy PG 42300 displays the result of the judgment in step S1200, in other words, whether each checkpoint lies within the data protection term or outside the data protection term (step S1205). More specifically, the checkpoint copy PG 42300 displays a CDPG operation state display screen 92000 (described subsequently).

Thereafter, the checkpoint copy PG 42300 judges whether there is an instruction from the system administrator to generate a copy at the checkpoint ('checkpoint copy generation instruction' hereinbelow) on the CDPG operation state display screen 92000 that was displayed in step S1205 (step S1210).

If there is a copy generation instruction, the checkpoint copy PG 42300 instructs the storage device 20000 to generate a copy of the checkpoint (step S1215). More specifically, the checkpoint copy PG 42300 issues an instruction to generate a copy to the storage device 20000 by generating a new entry for the copy VOL table 22600 of the storage device 20000 by taking the VOL ID indicating the data VOL 25500 of the CDPG 28000 as the value of the copy source VOL field 22610, the VOL ID indicating the VOL 25000 designated by the system administrator as the value of the copy destination VOL field 22620, and the time of the checkpoint designated by the system administrator as the time field 22630 (in reality, the checkpoint copy PG 42300 instructs the storage device 20000 to create such an entry). Further, in cases where the system administrator has not designated a copy destination VOL 25000, for the copy destination VOL 25000, an unused VOL 25000 having a capacity the same as or equal to or more than that of the copy-source data VOL 25500 is optionally selected by the checkpoint copy PG 42300 of the management computer 40000 or the storage device 20000.

A description of the flowchart for the processing that is executed by the checkpoint copy PG 42300 was described hereinabove.

FIG. 12 is a flowchart for the processing that is executed by the CDPG recovery PG 42400.

First, the CDPG recovery PG 42400 checks whether each checkpoint held by the CDPG 28000 lies within or outside the data protection term (step S1300). Here, processing that is the same as that in step S1200 of the checkpoint copy PG 42300 is carried out.

Thereafter, the CDPG recovery PG 42400 displays the result of the judgment of step S1200, in other words, whether each checkpoint lies within the data protection term or outside the data protection term (step S1305). More specifically, the CDPG recovery PG 42400 displays a CDPG recovery screen 93000 (described subsequently).

Thereafter, the CDPG recovery PG 42400 judges whether there is a recovery instruction from the system administrator on the CDPG recovery screen 93000 that was displayed in step S1305 (step S1310).

If there is no recovery instruction, the processing of this program 42400 ends.

If there is a recovery instruction, the CDPG recovery PG 42400 issues a recovery instruction to the storage device 20000 (step S1315). Based on this instruction, the microcode PG 22100 of the storage device 20000 restores the data of the data VOL 25500 of the CDPG 28000 to the designated time or the time of the designated checkpoint. In other words, the microcode PG 22100 references the checkpoint table 22500 and confirms that the copy state of the designated checkpoint is 'copied' (step S1316). When the copy state of the designated checkpoint is 'copied', the copy of the data VOL 25500 created at that checkpoint is then the restored data (step S1317). However, in cases where the copy state of the designated checkpoint is a state other than 'copied', as usual, the JNL is applied to the base VOL 26000 and data are restored to the time of the checkpoint (step S1318). The restored data are stored in the recovery destination VOL 25000 designated by the system administrator. Further, in cases where the system administrator has not designated the recovery destination VOL 25000, for the recovery destination VOL 25000, an unused VOL 25000 with a capacity that is the same as or equal to or more than that of the recovery target data VOL 25500 is optionally selected by the CDPG recovery PG 42400 of the management computer 40000 or the storage device 20000. This processing ends after step S1317 or step S1318.

A flowchart of the processing executed by the CDPG recovery PG 42400 was described hereinabove.

<(1-4) Specific Operation for the CDP Constitution Management Processing of this Embodiment.>

Here, a description of the specific operation of the CDP constitution management processing shown in (1-3) will be described using the configuration information and I/O screen stored in the tables appearing in FIGS. 7 to 9, 13 to 18, and 26 to 29.

In this embodiment, the LU:LU1 of the host computer: H1 (that is, the CDPG 28000 that comprises, as constituent elements, the data VOL 25500 designated by same) is the CDP operation target.

The system administrator starts the CDPG operation PG 42200 of the management computer 40000.

In step S1100, CDPG 28000 is set by means of a CDP group setting screen 90000 as shown in FIG. 13. The CDP group setting screen 90000 is constituted, for example, by a field 90010 to which the storage device 20000 is input, a field 90015 to which a CDPG nickname is input, a field 90020 to which the data VOL 25500 is input, a field 90030 to which the JNL VOL capacity is input, a field 90040 to which a data protection term is input, a field 90050 to which the checkpoint instruction interval is input, and a button 90060 for approving the CDPG creation. Here, the values displayed in each field of FIG. 13 are each set. New entries for the CDPG operation table 43200 of the management computer 40000 are created as shown in FIG. 9B by means of this step S1100 and the following step S1105 and new entries for the CDPG table 22300 of the storage device 20000 is created, and the acquisition of the JNL of data VOL: st1v01 of the storage device: ST1 is started by the JNL creation PG 22110.

Further, in place of the field for inputting the data VOL 25500 of the CDP group setting screen 90000, as shown in FIG. 27, field 90021, to which the host computer 10000 is input, and field 90022, to which the LU ID is input, may be provided. Here, the CDPG operation PG 42200 is able to reference the LU management table 12500 of the host computer 10000 in order to determine the data VOL 25500 from the LU ID and the host computer 10000. Furthermore, the JNL VOL capacity 90031 and data protection term 90041 may be designated using a duration such as 'the previous three hours', as per FIG. 27. Here, the CDPG operation PG 42200 is also able to estimate the capacity of the data protection term and the JNL VOL capacity by using the approximate data volume written per unit time, which is empirically determined as mentioned earlier.

Thereafter, the JNL are updated and the information of the table that the storage device 20000 comprises is constituted as shown in FIGS. 7, 8 and 26 and it is assumed that, in this state, the configuration information is collected in step S1110.

In step S1115, the CDPG operation PG 42200 executes the checkpoint copy PG 42300.

In step S1200, the checkpoint copy PG 42300 checks whether each checkpoint lies within the data protection term or outside the protection term. The data protection term is set at 200 GB and, therefore, in cases where the JNL have accumulated as per FIG. 8B, the checkpoint CP:g01_cp01 (08:10 on Jan. 1, 2007) and the checkpoint CP:g01_cp02 (08:40 on Jan. 1, 2007) lies outside the data protection term. The other checkpoints lie within the data protection term.

In step S1205, the checkpoint copy PG 42300 displays the CDPG operation state display screen 92000 shown in FIG. 14. The CDPG operation stated is play screen 92000 comprises, for example, a field 92010 to which the storage device 20000 is output, a field 92015 to which the CDPG nickname is output, a field 92020 to which the data VOL 25500 is output, a field 92030 to which the JNL VOL capacity is output, and a field 92040 to which the data protection term is output. The values of the respective fields of the entries of the CDPG operation table 43200 of the management computer 40000 are output to these fields.

In addition, the CDPG operation state display screen 92000 comprises a CDPG operation state field 92050 to which the state of the operation for the checkpoint held by the CDPG 28000 ('CDPG operation state' hereinbelow) is output. This field 92050 is constituted in table form so as to comprise, for all of the respective checkpoints within the restorable term, for example, a selection column 92051 for selecting a checkpoint, a column 92052 to which the checkpoint ID is output, a column 92053 to which the time of the checkpoint is output, a column 92054 to which an indication of whether the checkpoint lies within the data protection term or outside the data protection term is output, and a column 92055 to which the copy state is output. The values obtained by referencing the checkpoint table 22500 and the copy VOL table 22600 of the storage device 20000 (these tables are acquired in step S1110) and the result of step S1200 are output to this field. As per the description of FIG. 27, the output of the data VOL 25500 may be a set of a field 92021 to which the host computer 10000 is output and a field 92022 to which the LU ID is output. Furthermore, the JNL VOL capacity 90031 and the data protection term 90041 may be output in the duration such as 'the previous three hours'.

As a result of the CDPG operation state display screen 92000 being displayed, the system administrator is able to learn the CDPG operation state at the time point displayed by this screen 92000, that is, all of the checkpoints that lie within the restorable term, and the checkpoints outside the data protection term among these checkpoints.

Suppose that, in step S1210, the system administrator issued a checkpoint copy generation instruction. As shown in FIG. 14, this instruction is issued, for example, as a result of the system administrator designating the checkpoint which is the copy generation target according to column 92051 for selecting a checkpoint which is the copy generation target, designating a copy destination VOL 25000 in the field 92060 for designating a copy destination VOL 25000, and then pushing a copy generation button 92070.

In step S1215, the checkpoint copy PG 42300 instructs the JNL creation PG 22110 of the storage device 20000 to generate a copy at the designated checkpoint. More specifically, the checkpoint copy PG 42300 copies the data of the data VOL 25500 at the checkpoint: g01_cp02 to VOL: st1v04 on the basis of the content of the settings of shown in FIG. 14 and, therefore, the value of the used field 22220 of VOL: st1v04 in the VOL table 22200 of the storage device 20000 is changed to 'copied', and a new entry is created with the value of the copy-source VOL field 22610 in the copy VOL table 22600 as 'st1v01', the copy-destination VOL field 22620 as 'st1v04', the time field 22630 as the time of checkpoint: g01_cp02 and an instruction to generate a copy for checkpoint: g01_cp02 for the JNL creation PG 22110 is issued.

As a result of the above, the information of the tables that the storage device 20000 comprises is as per FIGS. 15 and 28.

In this state, when CDPG configuration information is collected in step S1110 and the CDPG operation state display screen 92000 is displayed in step S1205, the CDPG operation state display screen 92000 in this case is as shown in FIG. 16. In other words, the copy state of checkpoint: g01_cp02 is 'copied'.

Here, because the specific operation of the CDPG recovery PG 42400 is described, the information of the tables and so forth that the storage device 20000 comprises makes the transition from the constitution of FIGS. 15 and 28 to the constitution of FIGS. 17 and 29. The difference in the constitution lies with the difference between FIGS. 28A and 29A. In other words, FIG. 29A shows that the checkpoints from g01_cp01 to g01_c03 are not included in the CDPG operation state field 92050 and that these checkpoints lie outside the restorable term. Therefore, in the state following the transition, the data of the checkpoints from the checkpoint: g01_cp01 to checkpoint: g01_cp03 can no longer be restored.

Suppose that, in the state following this transition, the CDPG recovery PG 42400 is executed in step S1120.

The CDPG recovery PG 42400 checks in step S1300 whether each checkpoint lies within the data protection term or outside the protection term.

In step S1305, the CDPG recovery PG 42400 displays candidates for the recovery time designated by the system administrator (data of the data VOL 25500 are restored to this time) by means of the CDPG recovery screen 93000 shown in FIG. 18.

The CDPG recovery screen 93000 comprises, for example, a field 93010 to which the storage device 20000 is output, a field 93015 to which a CDPG nickname is output, a field 93020 to which data VOL 25500 is output (the output of the data VOL 25500 may be a set of field 92021 to which the host computer 10000 is output and a field 92022 to which the LU ID is output). These fields have the values of the respective fields of the entries in the CDPG operation table 43200 of the management computer 40000 output thereto.

In addition, the CDPG recovery screen 93000 comprises a CDPG operation state field 93050 to which the CDPG operation state is output. The constitution of this field 93050 is the same as the CDPG operation state field 92050 of the CDPG operation state display screen 92000. However, in addition to all of the checkpoints within the restorable term, this field 93050 also displays checkpoints outside the restorable term at which a copy has been generated. In addition, the CDPG recovery screen 93000 comprises a time elapsed state display field 93033. The time elapsed state display field 93033 comprises, for example, a time field 93032 that indicates the start and end times of the data protection term on a number line that represents the time elapsed, a mark 93031 that indicates at which time each checkpoint exists, and a data protection term display 93030 that indicates whether the mark 93031 lies within the data protection term. Values obtained by referencing the checkpoint table 22500 and copy VOL table 22600 of the storage device 20000 (these tables are acquired in step S1110) and the result of step S1300 are output to these fields.

As a result of displaying such a CDPG recovery screen 93000, the system administrator is also able to learn, in addition to the checkpoints lying within the restorable term, checkpoints outside the restorable term at the times of which checkpoint a copy has been generated and is able to designate these checkpoints as recovery times.

In step S1310, the system administrator issues a recovery instruction by designating a recovery time. The designation of a recovery time may be executed by inputting to the time designation field 93040 an optional time that is unrelated to the checkpoint or may be performed by selecting any of the checkpoints displayed in the CDPG operation state field 93050, for example, as shown in FIG. 18 (selection column 93051 is utilized).

When a recovery instruction is issued in step S1310, the CDPG recovery PG 42200 instructs the storage device 20000 to perform recovery in step S1315 and the storage device 20000, which receives the recovery instruction, executes recovery by performing processing from steps S1316 to S1318.

The specific operation of the CDP constitution management processing according to this embodiment was described hereinabove.

According to this embodiment, the system administrator is able to easily grasp the relationship between the data protection term of the CDPG 28000 which is the CDP operation target and the checkpoints such that, even in cases where a checkpoint designated as important by the system administrator lies outside the restorable term, restoration to the checkpoint is possible.

This embodiment was described hereinabove.

Further, although a checkpoint is created at the time the freezing of an application is performed in this embodiment, the creation of a checkpoint is not necessarily limited to such a time and can take place at an optional time.

First Modified Example of this Embodiment

In the first modified example, the management computer 40000 is able to automatically execute the generation of a copy at a predetermined checkpoint as a result of the system administrator pre-designating the checkpoint at which the copy is generated (one checkpoint per hour and one checkpoint among three consecutive checkpoints, for example). That is, regular monitoring by the system administrator is not required and a copy at a checkpoint that is outside the restorable term can be generated automatically.

<(2-1) The Constitution of the Computer System and CDPG Constitution Management Processing of the First Modified Example.>

Only the differences from the above embodiment will be described for the computer system constitution of the first modified example. The constitution for which there is no particular description is the same as that of the embodiment above.

Figure 21:
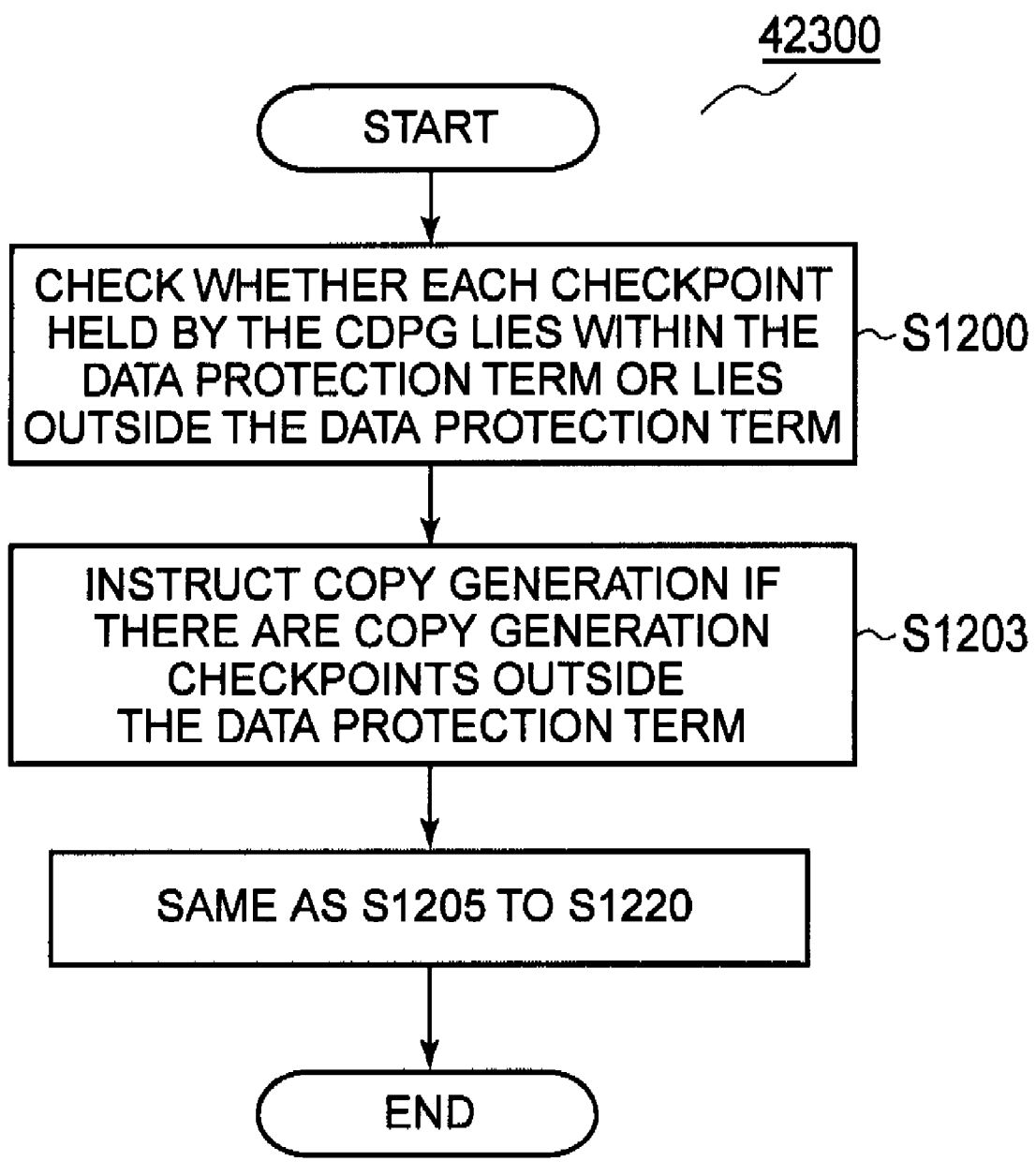
FIG. 21 is a flowchart of the processing executed by the checkpoint copy PG of the first modified example of the first embodiment of the present invention.

The differences from the embodiment are the checkpoint table 22500' shown in FIG. 19 and the CDPG operation table 43200', the CDP group setting screen 90000' shown in FIG. 20, the process flow of the checkpoint copy PG 42300 shown in FIG. 21, and the CDPG operation state display screen 92000' shown in FIG. 22. The aforementioned table, screens, and process flow will be described in order hereinbelow.

FIG. 19A shows an example of the checkpoint table 22500' of the first modified example.

The difference from the embodiment lies in the fact that this table 22500' further comprises a copy execution field 22580 that indicates whether the generation of a copy at the checkpoint is executed automatically. The copy execution field 22580 is set with 'required' in cases where the generation of a copy at the checkpoint is executed automatically and with 'not required' when copy generation is not executed, for example. The values of the field 22580 for each checkpoint are determined based on the value set in the copy generation checkpoint instruction interval field 43270 of the CDPG operation table 43200' (described subsequently). For example, when a new entry is registered in this table 22500', it is judged whether the interval between the time of the latest checkpoint already registered and the time of the newly registered checkpoint is equal to or more than a value that is set for the copy generation checkpoint instruction interval field 43270. If this interval is indeed equal to or more than the value set for field 43270, 'required' is set but otherwise 'not required' is set.

FIG. 19B shows an example of the CDPG operation table 43200' of the first modified example.

The difference from the embodiment above lies with the fact that this table 43200' further comprises a copy generation checkpoint instruction interval field 43270 that indicates the temporal interval for determining the checkpoint ('copy generation checkpoint') for generating a copy. The copy generation checkpoint instruction interval field 43270 is set with a value that is input from field 90060 on the subsequently described CDP group setting screen 90000'.

FIG. 20 shows the CDP group setting screen 90000' of the first modified example.

The difference from the above embodiment lies with the fact that this screen 90000' further comprises a field 90060 to which a temporal interval for determining the copy generation checkpoint is input. As mentioned earlier, the value input to this field 90060 is set in the copy generation checkpoint instruction interval field 43270 of the CDPG operation table 43200'.

FIG. 21 shows a flowchart for the processing executed by the checkpoint copy PG 42300 of the first modified example.

The difference from the embodiment above is that step S1203 is executed during the transition from step S1200 to step 1205.

In step S1203, if there is a copy generation checkpoint outside the data protection term, an instruction for the generation of a copy at this checkpoint is issued. More specifically, the checkpoint copy PG 42300 references the value of the copy execution field 22580 of the checkpoint table 22500' for all of the checkpoints judged to lie outside the data protection term in step S1200 and issues an instruction to generate a copy at those checkpoints for which 'required' is set.

FIG. 22 shows an example of a CDPG operation state display screen 92000' of the first modified example.

The difference from the embodiment above is that the CDPG operation state field 92050 of this screen 92000' further comprises a column 92056 that displays the value of the copy execution field 22580 of the checkpoint table 22500'. As a result of column 92056 being displayed, the system administrator is able to learn whether a copy at each checkpoint has been automatically generated and is able, on that basis, to issue a copy generation instruction for the checkpoints judged to be important among the checkpoints at which a copy has not been created.

The constitution of the computer system and the CDPG constitution management processing according to the first modified example was described hereinabove.

According to the first modified example, as a result of the system administrator pre-designating a checkpoint for generating a copy, the management computer 40000 is able to automatically execute the generation of a copy at the checkpoint. In other words, the burden of the regular monitoring by the system administrator can be lightened.

Further, the fact that the CDPG constitution management processing of the embodiment above is also possible can be easily surmised from the CDPG constitution management processing of the first modified example. In other words, according to the first modified example, the system administrator is able to place emphasis on a backup operation method that suppresses the data content of the VOL 25000 that is utilized for the copy at the checkpoint, place emphasis on a backup operation method for which regular monitoring by the system administrator is not required, or employ a backup operation method according to the backup policy of the business system.

The first modified example was described hereinabove.

Further, so too for the first modified example, the checkpoints are not limited to the time at which freezing of an application is performed but rather can be created at optional times.

Second Modified Example of this Embodiment

In the second modified example, a method that not only generates a copy at a checkpoint but also reduces the JNL application amount in recovery to a time within the data protection term by also executing changes to the constitution of the base VOL 26000 will be described.

<(3-1) Constitution of the Computer System and CDPG Constitution Management Processing of the Second Modified Example.>

The computer system constitution of the second modified example is the same as that of the first modified example.

Figure 23:
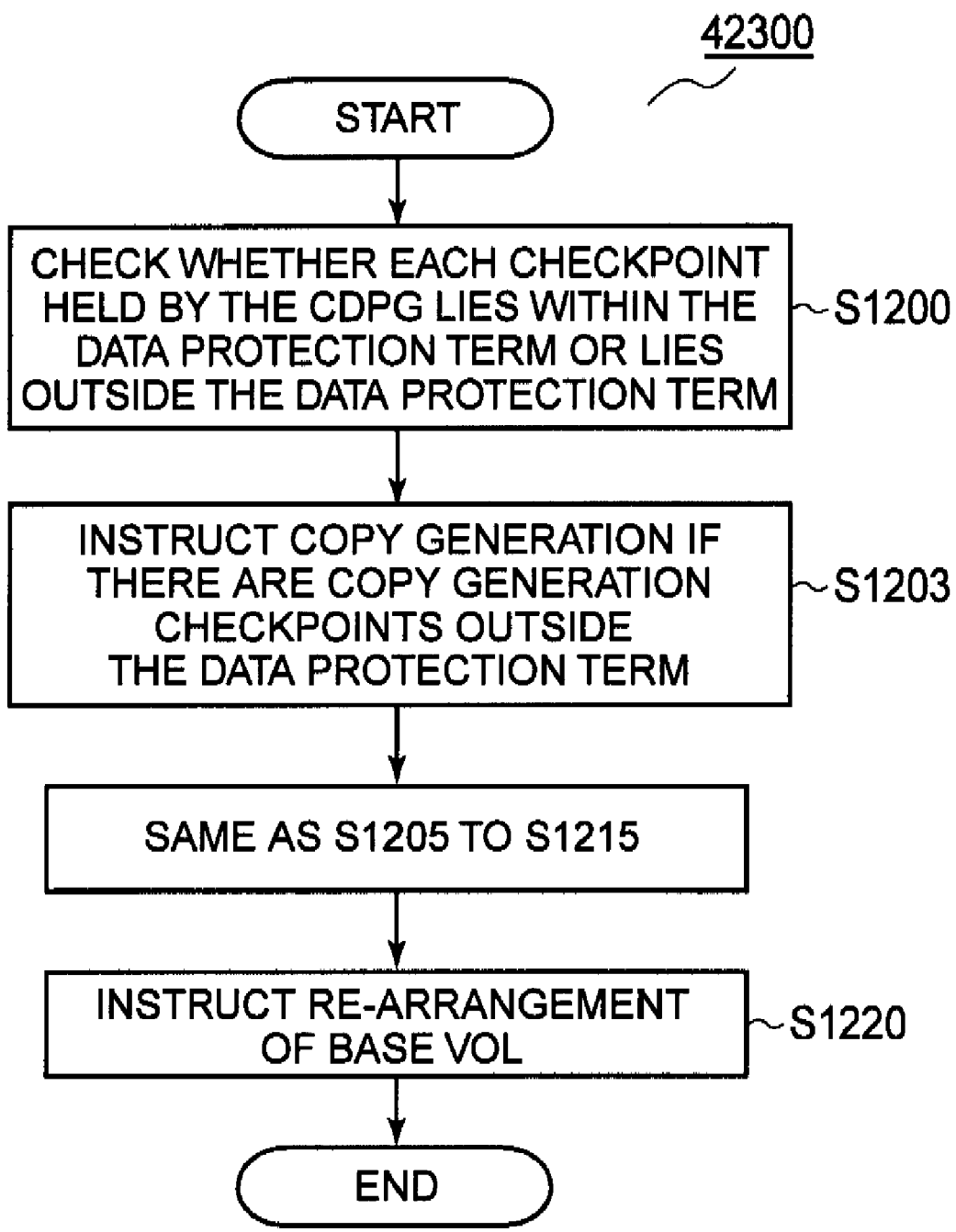
FIG. 23 is a flowchart of the processing executed by the checkpoint copy PG of a second modified example of the first embodiment of the present invention.

The difference from the first modified example of the CDPG constitution management processing of the second modified example is the processing executed by the checkpoint copy PG 42300. FIG. 23 shows a flowchart for the processing that is executed by the checkpoint copy PG 42300 of the second modified example. In the second modified example, processing to re-arrange the base VOL 26000 is added in step S1220.

As a result of the re-arrangement of the base VOL 26000 of step S1220, the JNL application amount when performing recovery to a predetermined time within the data protection term is reduced. This will now be described using FIG. 24.

First, suppose that, prior to the execution of step S1220, as shown in FIG. 24A, the JNL from 10:00 to 15:00 exist in JNL VOL 27000, the data protection term is defined as being from 12:00 to 15:00, base VOL1 holds the restoration data for 10:00, and base VOL2 holds restoration data for 12:30. Here, the data of a data protection term from 12:00 to 12:30 defined by the system administrator, for example, must be recovered by utilizing base VOL1 and, as shown in FIG. 24A, the JNL application amount is then extremely large. However, the data close to 10:00 outside the data protection term is recovered by means of base VOL1 and the JNL application amount is extremely small. The magnitude of the JNL application amount has an influence of the amount of time required for recovery. Accordingly, the re-arrangement of the base VOL 26000 within the data protection term makes it possible to reduce the JNL application amount within the data protection term.

Therefore, one method of re-arrangement in step S1220 is a method that 'eliminates the base VOL 26000 disposed outside the data protection term and performs re-arrangement from the oldest time to the newest time of the data protection term so that the creation times of the base VOL 26000 are divided up at equal intervals in data protection term'. FIG. 24B shows the relationship between the creation times of the base VOL 26000 and the JNL application amount as a result of executing this method.

More specifically, in step S1220, the checkpoint copy PG 42300 checks whether each CP lies within the data protection term or outside the data protection term as per step S1200.

Thereafter, the checkpoint copy PG 42300 references the CDPG table 22500 of the storage device 20000 to extract the base VOL 26000 used in order to recover the checkpoints outside the data protection term.

If there is one extracted base VOL 26000, the checkpoint copy PG 42300 performs re-arrangement so that the time of the base VOL 26000 is the oldest time of the data protection term.

If there are two or more extracted base VOL 26000, the checkpoint copy PG 42300 performs re-arrangement so that the time of the base VOL 26000 which is closest to the current time among the plurality of base VOL 26000 becomes the oldest time of the data protection term. In addition, the checkpoint copy PG 42300 performs re-arrangement of the times of the remaining base VOL 26000 such that the creation times of the base VOL 26000 are divided up at equal intervals in the data protection term.

Further, the above re-arrangement processing may be implemented by applying the JNL also to the re-arranged times for the base VOL 26000 in the storage device 20000, for example.

Furthermore, another method of re-arrangement in step S1220 is a method that 'eliminating the base VOL 26000 that are disposed outside the data protection term and performing re-arrangement of the interval from the oldest time to the newest time of the data protection term so that the JNL application amounts are divided up into equal amounts'. FIG. 24C shows the relationship between the creation times of the base VOL 26000 and the JNL application amounts as a result of executing this method.

More specifically, the checkpoint PG 42300 checks in step S1220 whether each checkpoint lies within the data protection term or outside the data protection term as per the management computer 40000 in step S1200.

Thereafter, the checkpoint copy PG 42300 references the CDPG table 22500 of the storage device 20000 to extract the base VOL 26000 used in order to recover the checkpoints outside the data protection term.

If there is one extracted base VOL 26000, the checkpoint copy PG 42300 performs re-arrangement so that the time of the base VOL 26000 becomes the oldest time of the data protection term.

If there are two or more extracted base VOL 26000, the checkpoint copy PG 42300 performs re-arrangement so that the time of the base VOL 26000 that is closest to the current time among the plurality of base VOL 26000 becomes the oldest time of the data protection term. In addition, the checkpoint copy PG 42300 re-arranges the remaining base VOL 26000 so that the JNL application amounts are equal amounts.

Further, the above re-arrangement processing may be implemented by applying the JNL also to the re-arranged times for the base VOL 26000 in the storage device 20000, for example.

The computer system constitution and CDPG constitution management processing according to the second modified example was described hereinabove.

The second modified example not only permits the generation of a copy at a checkpoint but also makes it possible to eliminate the JNL application amount in the recovery to a time within the data protection term by also implementing changes to the constitution of the base VOL 26000, whereby the time required for recovery to a predetermined time of the data protection term can be shortened.

The second modified example was described hereinabove.

In the second modified example, the re-arrangement processing of the base VOL need not necessarily accompany the generation of the copy at a checkpoint. Only the re-arrangement of the base VOL need be implemented.

The few embodiments and modified examples of the present invention above are only examples serving to explain the present invention, there being no intention to limit the scope of the present invention to these embodiments alone. The present invention can also be implemented in a variety of other forms without departing from the spirit of the invention.

Figure 25:
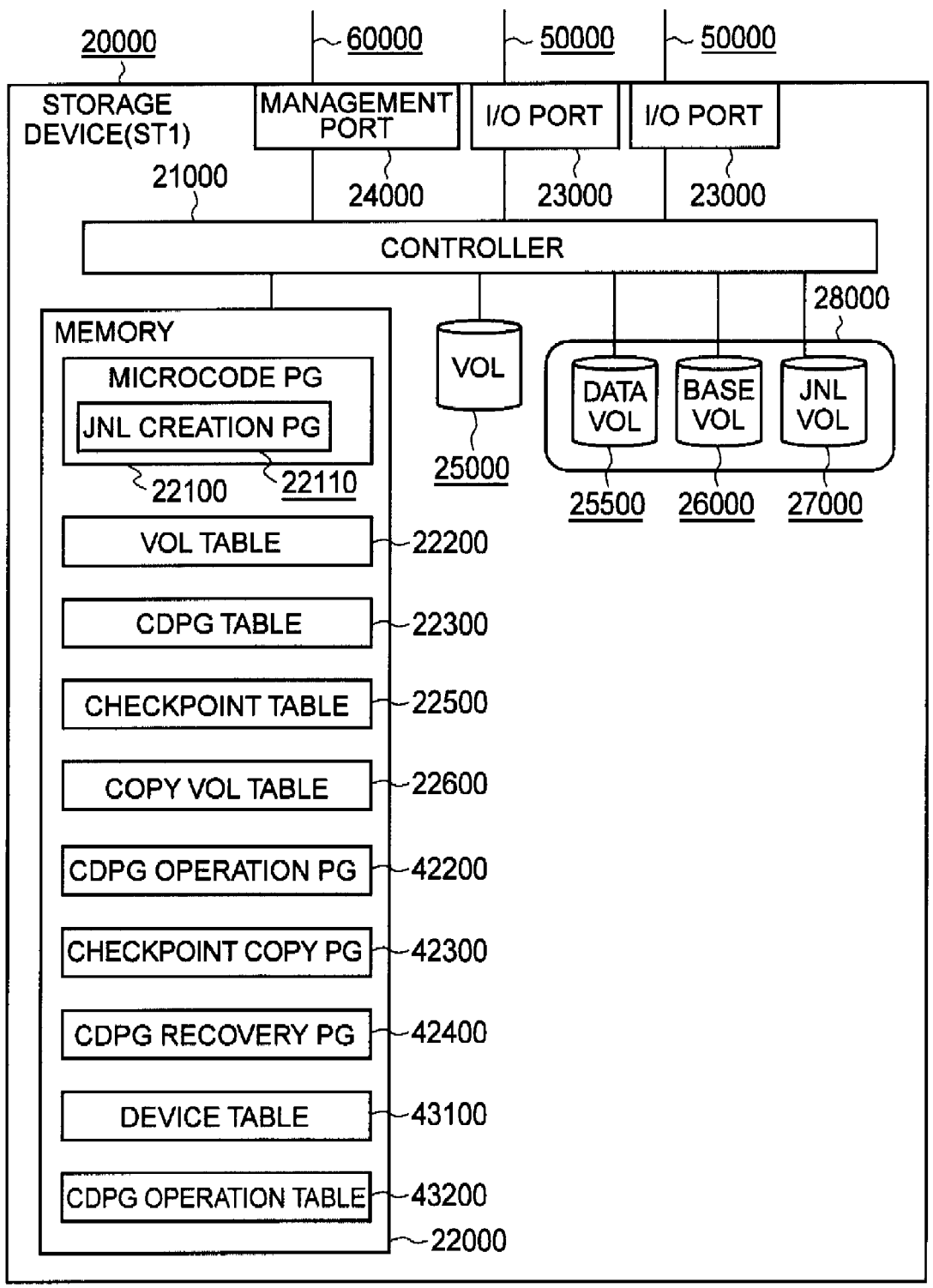
FIG. 25 shows a modified example of the constitution of the storage device.

For example, as shown in FIG. 25, the storage device may also be provided with a program and table for implementing CDPG constitution management processing. In this case, the system administrator is able to execute CDPG constitution management processing by directly operating the storage device 20000 via the management network by using the management terminal 70000.

What is claimed is:

1. A management device for a storage device having a data volume which is a logical volume to which data constituting a write target transmitted by a higher-level device are written, a base volume which is a data image of the data volume, a journal storage region which accumulates write data to the data volume as a journal, and a storage control section which recovers the data volume by applying the journal to the base volume, the management device comprising:
a data protection term acquisition section which acquires a data protection term which is a term in which the recovery of the data volume is ensured from a predetermined duration for which a predetermined time is taken as a reference point;
a control section which executes control using the data protection term;
an input section for accepting an input of a value used to determine the duration; and
a duration determination section for determining the duration by using the value thus input, wherein
the input section accepts a smaller data amount than a data amount of the journal volume constituting the journal storage region as the value; and
the duration determination section determines, as the duration, time required until a write amount per unit time with respect to the journal volume reaches an input data amount on the basis of the write amount.

2. A management device for a storage device having a data volume which is a logical volume to which data constituting a write target transmitted by a higher-level device are written, a base volume which is a data image of the data volume, a journal storage region which accumulates write data to the data volume as a journal, and a storage control section which recovers the data volume by applying the journal to the base volume, the management device comprising:
a data protection term acquisition section which acquires a data protection term which is a term in which the recovery of the data volume is ensured from a predetermined duration for which a predetermined time is taken as a reference point;
a control section which executes control using the data protection term;
an input section for accepting an input of a value used to determine the duration; and
a duration determination section for determining the duration by using the value thus input, wherein
the input section accepts, as the value, a percentage of a data capacity of the journal volume constituting the journal storage region; and
the duration determination section determines, as the duration, time required until a write amount per unit time with respect to the journal volume reaches a data amount corresponding to the input percentage for the data amount of the journal volume, on the basis of the write amount.

3. The management device according to claim 1, further comprising a restorable term acquisition section which acquires a restorable term, which is a term in which the data volume can be restored, and for which the predetermined time is a reference point, from a time at which the base volume has been created and a time recorded in journals accumulated in the journal volume, wherein the control section outputs one or more non-protected times which are one or more times contained in the restorable term but not contained in the data protection term, and
wherein the control section accepts selection of a non-protected time that is desired by an administrator among the one or more non-protected times thus output and transmits a copy instruction to generate a copy of the data volume at the selected non-protected time desired by the administrator to the storage control section of the storage device.

4. The management device according to claim 3, wherein the control section displays a recovery instruction acceptance screen which accepts an instruction to recover a data volume at a time desired by the administrator among a plurality of times and transmits to the storage control section of the storage device a recovery instruction to recover the data volume at the time, which is desired by the administrator, selected from the plurality of times; and
the plurality of times displayed on the recovery instruction acceptance screen include the one or more non-protected times and one or more protection times which are one or more times contained in both the restorable term and the data protection term and include a copy time which is not contained in the restorable term but which is a non-protected time which is the target of the copy instruction.

5. A management device for a storage device having a data volume which is a logical volume to which data constituting a write target transmitted by a higher-level device are written, a base volume which is a data image of the data volume, a journal storage region which accumulates write data to the data volume as a journal, and a storage control section which recovers the data volume by applying the journal to the base volume, the management device comprising:
a data protection term acquisition section which acquires a data protection term which is a term in which the recovery of the data volume is ensured from a predetermined duration for which a predetermined time is taken as a reference point;
a control section which executes control using the data protection term; and
a restorable term acquisition section which acquires a restorable term, which is a term in which the data volume can be restored, and for which the predetermined time is a reference point, from a time at which the base volume has been created and a time recorded in journals accumulated in the journal volume,
wherein the control section selects a non-protected time from among one or more non-protected times which are one or more times contained in the restorable term but not contained in the data protection term and transmits a copy instruction to generate a copy of the data volume at the selected non-protected time to the storage control section of the storage device.

6. The management device according to claim 5, further comprising a temporal interval input section which accepts an input of a temporal interval in which the control section selects a non-protected time, wherein
the control section performs the selection of a non-protected time for each temporal interval.

7. A computer system, comprising:
a storage device; and
a management device for the storage device, wherein the storage device comprises:

a data volume which is a logical volume to which write target data transmitted by a higher-level device are written;

a base volume which is a data image of the data volume;

a journal storage region which accumulates write data written to the data volume as journals; and a storage control section which recovers the data volume by applying the journal to the base volume, wherein the management device comprises:

a data protection term acquisition section which acquires a data protection term which is a term in which recovery of the data volume is ensured from a predetermined duration for which a predetermined time is taken as a reference point; and a control section which executes control employing the data protection term, and wherein the control section accepts selection of a non-protected time desired by an administrator among the one or more non-protected times thus output and transmits to the storage control section of the storage device a copy instruction to generate a copy of the data volume at the selected non-protected time desired by the administrator, and the storage control section generates a copy of the data volume at the selected non-protected time desired by the administrator in response to the copy instruction.

8. The computer system according to claim 7, wherein the control section transmits to the storage control section of the storage device a recovery instruction which designates a time desired by the administrator and which is to recover a data volume at that time; and if the time designated by the recovery instruction is a time corresponding to a generated copy of the data volume, the storage control section restores the data volume to the designated time by utilizing the copy and, if the designated time is not a time that corresponds with the generated copy, the storage control section restores the data volume to the designated time by applying a journal to the base volume.

\* \* \* \* \*